United States Patent
Park et al.

(10) Patent No.: US 10,788,714 B2
(45) Date of Patent: Sep. 29, 2020

(54) LIQUID CRYSTAL DISPLAY AND MANUFACTURING METHOD OF THE SAME

(71) Applicant: Samsung Display Co., Ltd., Yongin-si (KR)

(72) Inventors: Heung Shik Park, Seoul (KR); Jae Hoon Jung, Anyang-si (KR); Dan Bi Yang, Gunpo-si (KR); Min-Joo Han, Seoul (KR); Ji Phyo Hong, Pyeongtaek-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/524,931

(22) Filed: Jul. 29, 2019

(65) Prior Publication Data

US 2019/0346721 A1     Nov. 14, 2019

Related U.S. Application Data

(62) Division of application No. 15/139,623, filed on Apr. 27, 2016, now abandoned.

(30) Foreign Application Priority Data

Jun. 3, 2015    (KR) .......................... 10-2015-0078617

(51) Int. Cl.
*G02F 1/1337*      (2006.01)
*G02F 1/1362*      (2006.01)
(Continued)

(52) U.S. Cl.
CPC .... *G02F 1/133753* (2013.01); *G02F 1/13624* (2013.01); *G02F 1/136286* (2013.01);
(Continued)

(58) Field of Classification Search
CPC ... G02F 1/133753; G02F 2001/133761; G02F 2001/134345; G02F 1/13458; G02F 1/133788; G02F 1/13624; G02F 1/136286
See application file for complete search history.

(56) References Cited

U.S. PATENT DOCUMENTS 6,825,892 B2   11/2004   Inoue et al.
7,365,822 B2    4/2008   Lee et al.
(Continued)

FOREIGN PATENT DOCUMENTS

CN     1439915     9/2003
CN     1716055     1/2006
(Continued)

OTHER PUBLICATIONS

Chinese Office Action—Chinese Patent Application No. 201610389310.6 dated May 26, 2020, citing references listed within.

*Primary Examiner* — Jia X Pan
(74) *Attorney, Agent, or Firm* — Cantor Colburn LLP

(57) ABSTRACT

A liquid crystal display includes a first substrate, pixel electrodes disposed on the first substrate and including a first sub-pixel electrode and a second sub-pixel electrode separated from each other and positioned in one pixel area, gate lines connected to the pixel electrodes, data lines connected to the pixel electrodes, reference voltage lines connected to the second sub-pixel electrode of the pixel electrodes, a second substrate facing the first substrate, a common electrode disposed on the second substrate, and a liquid crystal layer positioned between the first substrate and the second substrate and including liquid crystal molecules, a first initial pretilt angle of the liquid crystal molecules corresponding to the first sub-pixel electrode for the second substrate surface is larger than a second initial pretilt angle
(Continued)

of the liquid crystal molecules corresponding to the second sub-pixel electrode for the second substrate surface.

7 Claims, 22 Drawing Sheets

(51) Int. Cl.
 *G02F 1/1345* (2006.01)
 *G02F 1/1343* (2006.01)
(52) U.S. Cl.
 CPC .... *G02F 1/13458* (2013.01); *G02F 1/133788* (2013.01); *G02F 2001/133761* (2013.01); *G02F 2001/134345* (2013.01)

(56) References Cited

U.S. PATENT DOCUMENTS

| | | | |
|---|---|---|---|
| 7,630,030 B2 | 12/2009 | Jang et al. | |
| 8,427,595 B2 | 4/2013 | Yamazaki et al. | |
| 9,087,490 B2 | 7/2015 | Kim et al. | |
| 2003/0156245 A1 | 8/2003 | Lee et al. | |
| 2006/0001798 A1 | 1/2006 | Jang et al. | |
| 2008/0284697 A1* | 11/2008 | Nam | G02F 1/1345 345/87 |
| 2010/0007841 A1 | 1/2010 | Baek et al. | |
| 2010/0072469 A1 | 3/2010 | Yamazaki et al. | |
| 2011/0090443 A1* | 4/2011 | Han | G02F 1/1339 349/124 |
| 2011/0096449 A1* | 4/2011 | Lee | G02F 1/1345 361/91.1 |
| 2012/0105785 A1 | 5/2012 | Kim et al. | |
| 2012/0147282 A1* | 6/2012 | Shin | G02F 1/1368 349/38 |
| 2013/0143463 A1* | 6/2013 | Park | G02F 1/133753 445/24 |
| 2014/0055698 A1* | 2/2014 | Kim | G02F 1/136286 349/39 |
| 2015/0146124 A1* | 5/2015 | Kim | G02F 1/136286 349/42 |
| 2015/0160517 A1 | 6/2015 | Park et al. | |
| 2015/0268527 A1 | 9/2015 | Kwon et al. | |

FOREIGN PATENT DOCUMENTS

| | | |
|---|---|---|
| CN | 102466935 | 5/2012 |
| CN | 104134673 | 11/2014 |
| JP | 04175826 A | 6/1992 |
| KR | 1020070079614 A | 8/2007 |
| KR | 100850737 B1 | 7/2008 |
| KR | 1020140045122 A | 4/2014 |

\* cited by examiner

FIG. 12
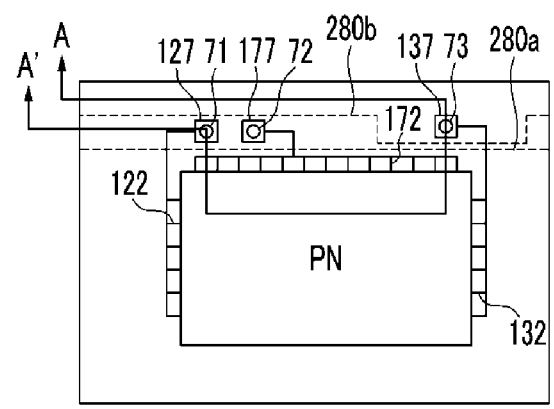
(a)
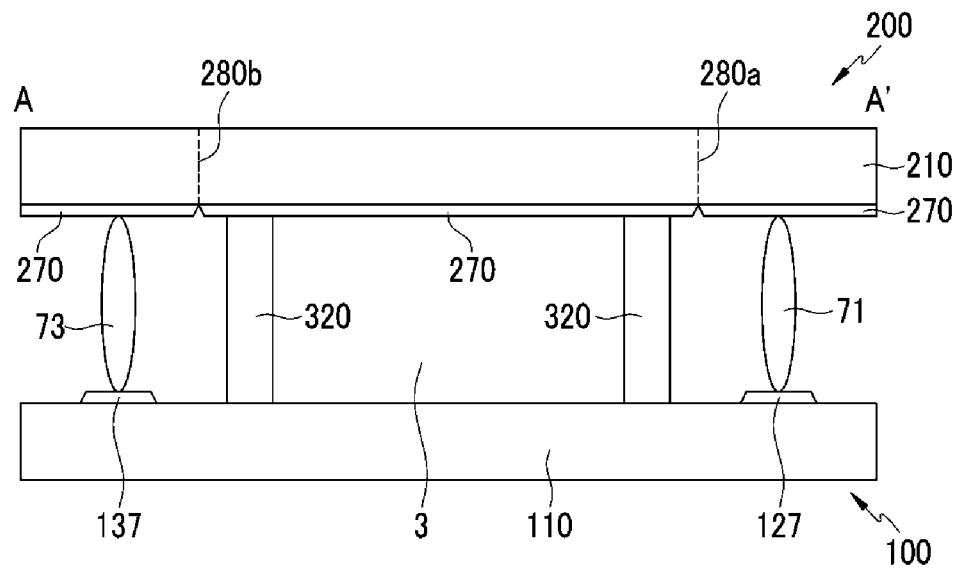
(b)

FIG. 13
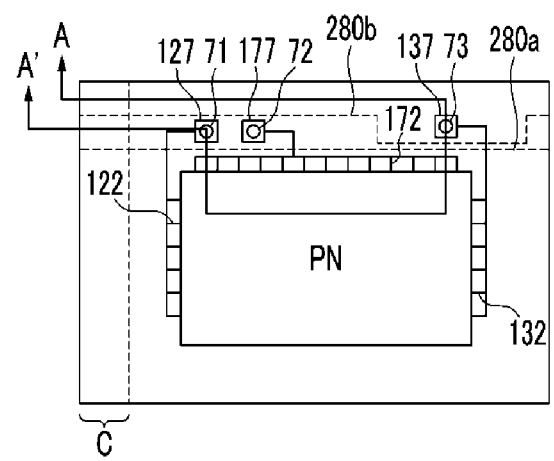
(a)
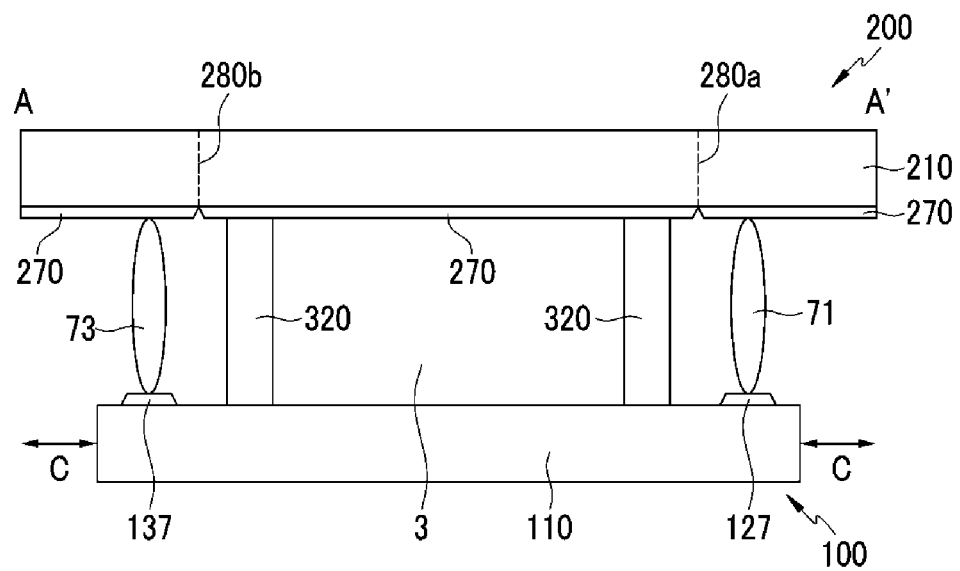
(b)

FIG. 14
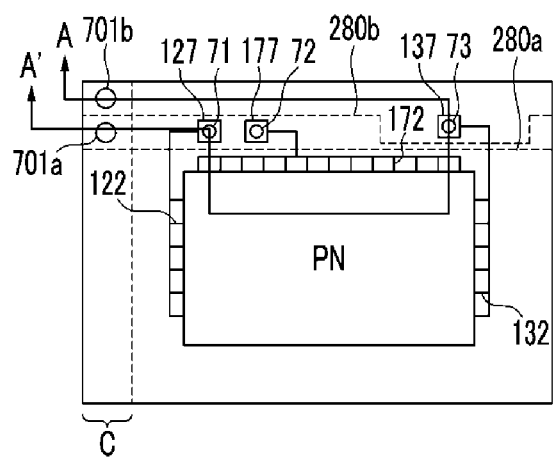
(a)
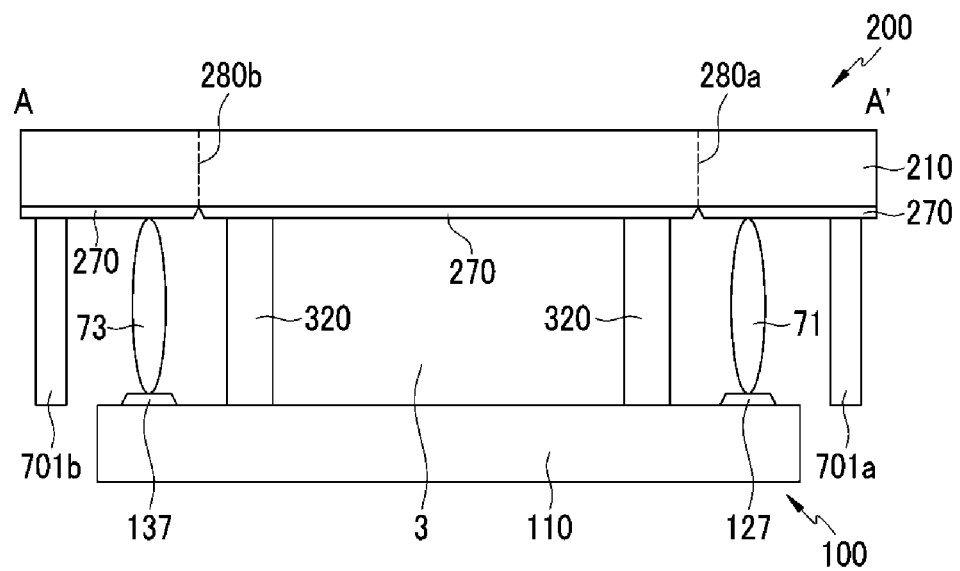
(b)

LIQUID CRYSTAL DISPLAY AND MANUFACTURING METHOD OF THE SAME

This application is a divisional application of U.S. patent application Ser. No. 15/139,623, filed on Apr. 27, 2016, which claims priority to Korean Patent Application No. 10-2015-0078617 filed on Jun. 3, 2015, and all the benefits accruing therefrom under 35 U.S.C. § 119, the content of which in its entirety is herein incorporated by reference.

BACKGROUND

1. Field

The described technology relates generally to a liquid crystal display and a manufacturing method thereof.

2. Description of the Related Art

Presently one of the most widely used types of flat panel displays ("FPDs"), liquid crystal displays ("LCDs") include two display panels formed with electric field generating electrodes and a liquid crystal layer interposed between the two display panels. In the LCD, voltages are supplied to electrodes to realign liquid crystal molecules of a liquid crystal layer so that an amount of transmitted light is adjusted.

Among LCDs, a vertically aligned mode LCD in which a long axis of the liquid crystal molecules is arranged to be vertical to a surface of a display panel in a state in which an electric field is not applied has received attention due to a high contrast ratio and a wide reference viewing angle thereof. Here, the reference viewing angle implies a viewing angle that is 1:10 in contrast ratio, or a critical angle of gray-to-gray luminance reversion.

In order for side visibility to approximate front visibility in the vertical alignment mode LCD, a method of causing a difference in transmittance by dividing one pixel into two sub-pixels and applying different voltages to the two sub-pixels, respectively, has been suggested.

To increase the response speed of the LCD, various methods for the liquid crystal molecules to be initially aligned have been proposed for providing an initial pretilt to the liquid crystal molecules. Among the initial alignment methods, in a method in which a prepolymer that is polymerized by light such as ultraviolet rays is used to provide the pretilt to liquid crystal molecules, each field generating electrode is applied with a voltage having a desired magnitude before ultraviolet ray exposure.

SUMMARY

In a manufacturing method of a liquid crystal display ("LCD"), a thin film pattern of a multi-layered structure is formed on a mother glass through a deposition process and a photolithography process to form a plurality of cells respectively including the thin film pattern of the multi-layered structure, and the mother panel glass is divided into a plurality of cells to complete the LCD. Also, in the initial alignment step of the liquid crystal molecules among manufacturing methods of LCDs, when applying the voltage, when the voltage is applied for each cell of the cut LCD and an exposure is performed, additional time and equipment are required such that productivity is lowered.

Also, generally in the initial alignment step of the liquid crystal molecule, a photo alignment is performed after applying all of the same voltage to two sub-pixel electrodes disposed in one pixel, and in this case, the initial pretilt angles of the liquid crystal molecules disposed in two sub-pixel areas in one pixel are formed to be equal to each other. However, to make the lateral visibility of the LCD of the vertical alignment mode approximate the frontal visibility, the initial pretilt angles of the liquid crystal molecules disposed in the sub-pixel areas may be different.

The described exemplary embodiments provide an LCD that reduces manufacturing costs by applying a voltage to a mother panel glass unit including a plurality of cells without application of a voltage in an initial alignment step for a cell of an LCD, and simultaneously, differentiating the initial pretilt angles of the liquid crystal molecules disposed in two sub-pixel areas, along with a manufacturing method thereof.

An LCD according to an exemplary embodiment includes a first substrate, a plurality of pixel electrodes disposed on the first substrate and including a first sub-pixel electrode and a second sub-pixel electrode separated from each other and positioned in one pixel area, a plurality of gate lines connected to the plurality of pixel electrodes, a plurality of data lines connected to the plurality of pixel electrodes, a plurality of reference voltage lines connected to the second sub-pixel electrode of the plurality of pixel electrodes, a second substrate facing the first substrate, a common electrode disposed on the second substrate, and a liquid crystal layer positioned between the first substrate and the second substrate and including a plurality of liquid crystal molecules, and a first initial pretilt angle of the liquid crystal molecules corresponding to the first sub-pixel electrode for the second substrate surface is larger than a second initial pretilt angle of the liquid crystal molecules corresponding to the second sub-pixel electrode for the second substrate surface.

In an exemplary embodiment, the LCD may further include a first pad connected to the plurality of gate lines, a second pad connected to the plurality of data lines, a third pad connected to the plurality of reference voltage lines, a first short point disposed on the first pad, a second short point disposed on the second pad, and a third short point disposed on the third pad.

In an exemplary embodiment, the first short point, the second short point, and the third short point may be electrically connected between the first pad, the second pad, and the third pad, and the common electrode, the first short point, and the second short point may be positioned at the first region, the third short point may be positioned at the second region, and the first region and the second region may be electrically separated.

In an exemplary embodiment, the LCD may further include a first TFT connected to the plurality of gate lines, the plurality of data lines, and the first sub-pixel electrode of the plurality of pixel electrodes, a second TFT connected to the plurality of gate lines, the plurality of data lines, and the second sub-pixel electrode of the plurality of pixel electrodes, and a third TFT connected to the plurality of gate lines, the second sub-pixel electrode of the plurality of pixel electrodes, and the plurality of reference voltage lines.

In an exemplary embodiment, the LCD may further include an alignment layer disposed on an inner surface of the first substrate and an inner surface of the second substrate, and at least one of the alignment layer and the liquid crystal layer may include a light polymerization material.

In an exemplary embodiment, the second pad and the second short point may be provided in a plurality, the plurality of data lines may be connected to a different plurality of second pads, and the plurality of second short points may be disposed on the plurality of second pads.

In an exemplary embodiment, the plurality of data lines and the second pads may be connected to each other by a first connection portion, and a width of the first connection portion may be greater than the width of the plurality of data lines.

In an exemplary embodiment, the plurality of data lines and the second pads may be connected to each other by a second connection portion, the second connection portion may include a low-resistance material, an insulating layer may be positioned between the plurality of data lines and the first connection portion, and the plurality of data lines and the second connection portion may be connected to each other through a contact hole defined in the insulating layer.

In an exemplary embodiment, the first short point, the second short point, and the third short point may be electrically connected to each other between the first pad, the second pad, and the third pad and the common electrode, the first short point may be positioned at the first region, the second short point may be positioned at the second region, the third short point may be positioned at the third region, and the first region, the second region, and the third region may be electrically separated.

In an exemplary embodiment, the first initial pretilt angle may be larger than the second initial pretilt angle by about 0.3 degrees to about 2 degrees, and the first initial pretilt angle may be larger than the second initial pretilt angle by about 1 degree.

A manufacturing method of an LCD according to an exemplary embodiment includes forming a first display panel including a plurality of pixel electrodes which include a first sub-pixel electrode and a second sub-pixel electrode separated from each other and positioned in one pixel area, a plurality of gate lines connected to the plurality of pixel electrodes, a plurality of data lines connected to the plurality of pixel electrodes, a plurality of reference voltage lines connected to the second sub-pixel electrode of the plurality of pixel electrodes, a first pad portion connected to a plurality of gate lines, a second pad portion connected to the plurality of data lines, and a third pad portion connected to the plurality of reference voltage lines, forming a second display panel including a common electrode, forming a first short point connected to the first pad portion, forming a second short point connected to the second pad portion, forming a third short point connected to the third pad portion, aligning and adhering the first display panel and the second display panel to each other, dividing the second display panel into a first region corresponding to the first short point and the second short point, a second region corresponding to the second short point, and a third region, and applying a first voltage to the first region, a second voltage to the second region, and a third voltage to the third region.

In an exemplary embodiment, the common electrode may be divided into a plurality of electrodes insulated from each other in the dividing the second display panel into the first region, the second region, and the third region.

In an exemplary embodiment, a laser may be used to divide the second display panel into the first region, the second region, and the third region.

In an exemplary embodiment, the first voltage applied to the first region may be transmitted to the first short point and the second short point through the common electrode of the second display panel and may be transmitted to the gate line and the data line through the first short point and the second short point, and the second voltage applied to the second region may be transmitted to the third short point through the common electrode of the second display panel and may be transmitted to the reference voltage line through the third short point.

In an exemplary embodiment, the third voltage applied to the third region may be transmitted only to the common electrode of the second display panel.

In an exemplary embodiment, the manufacturing method of the LCD may further include injecting a liquid crystal layer between the first display panel and the second display panel, and irradiating a light such as ultraviolet rays on the LCD after applying the first voltage to the first region, the second voltage to the second region, and the third voltage to the third region.

In an exemplary embodiment, the forming the first display panel may further include forming a first TFT connected to the plurality of gate lines, the plurality of data lines, and the first sub-pixel electrode of the plurality of pixel electrodes, a second TFT connected to the plurality of gate lines, the plurality of data lines, and the second sub-pixel electrode of the plurality of pixel electrodes, and a third TFT connected to the plurality of gate lines, the second sub-pixel electrode of the plurality of pixel electrodes, and the plurality of reference voltage lines.

In an exemplary embodiment, the second pad and the second short point may be provided in a plurality, the plurality of data lines may be connected to a plurality of different second pads, and the plurality of second short points may be disposed on the plurality of second pads.

In an exemplary embodiment, the plurality of data lines and the second pads may be connected to each other by a first connection portion, and the width of the first connection portion may be greater than the width of the plurality of data lines.

In an exemplary embodiment, the plurality of data lines and the second pads may be connected to each other by a second connection portion, the second connection portion may include a low-resistance material, and the plurality of data lines and the second connection portion may be connected to each other through a contact hole defined in an insulating layer positioned between the plurality of data lines and the first connection portion.

In an exemplary embodiment, the dividing the second display panel into the first region, the second region, and the third region may further include dividing the first region into a first sub-region corresponding to the first short point and a second sub-region corresponding to the second short point, the applying of the first voltage, the second voltage, and the third voltage may further include applying a first sub-voltage to the first sub-region and a second sub-voltage to the second sub-region, and the magnitudes of the first sub-voltage and the second sub-voltage may be different from each other.

In an exemplary embodiment, a first initial pretilt angle of the liquid crystal molecules corresponding to the first sub-pixel electrode for the second substrate surface may be larger than a second initial pretilt angle of the liquid crystal molecules corresponding to the second sub-pixel electrode for the second substrate surface.

In an exemplary embodiment, the first initial pretilt angle may be larger than the second initial pretilt angle by about 0.3 degrees to about 2 degrees, and the first initial pretilt angle may be larger than the second initial pretilt angle by about 1 degree.

According to the LCD and the manufacturing method thereof according to an exemplary embodiment, without the application of the voltage in the initial alignment for each cell of the LCD, by applying the voltage as the unit of the mother glass panel including the plurality of cells, the manufacturing cost may be reduced and simultaneously the initial pretilt angles of the liquid crystal molecules disposed in two sub-pixel areas may be differentiated.

BRIEF DESCRIPTION OF THE DRAWINGS

The above and other exemplary embodiments, advantages and features of this invention will become more apparent by describing in further detail exemplary embodiments thereof with reference to the accompanying drawings, in which:

FIGS. 10 to 15 are views showing an exemplary embodiment of a manufacturing method of an LCD according to the invention.

DETAILED DESCRIPTION

Figure 1:
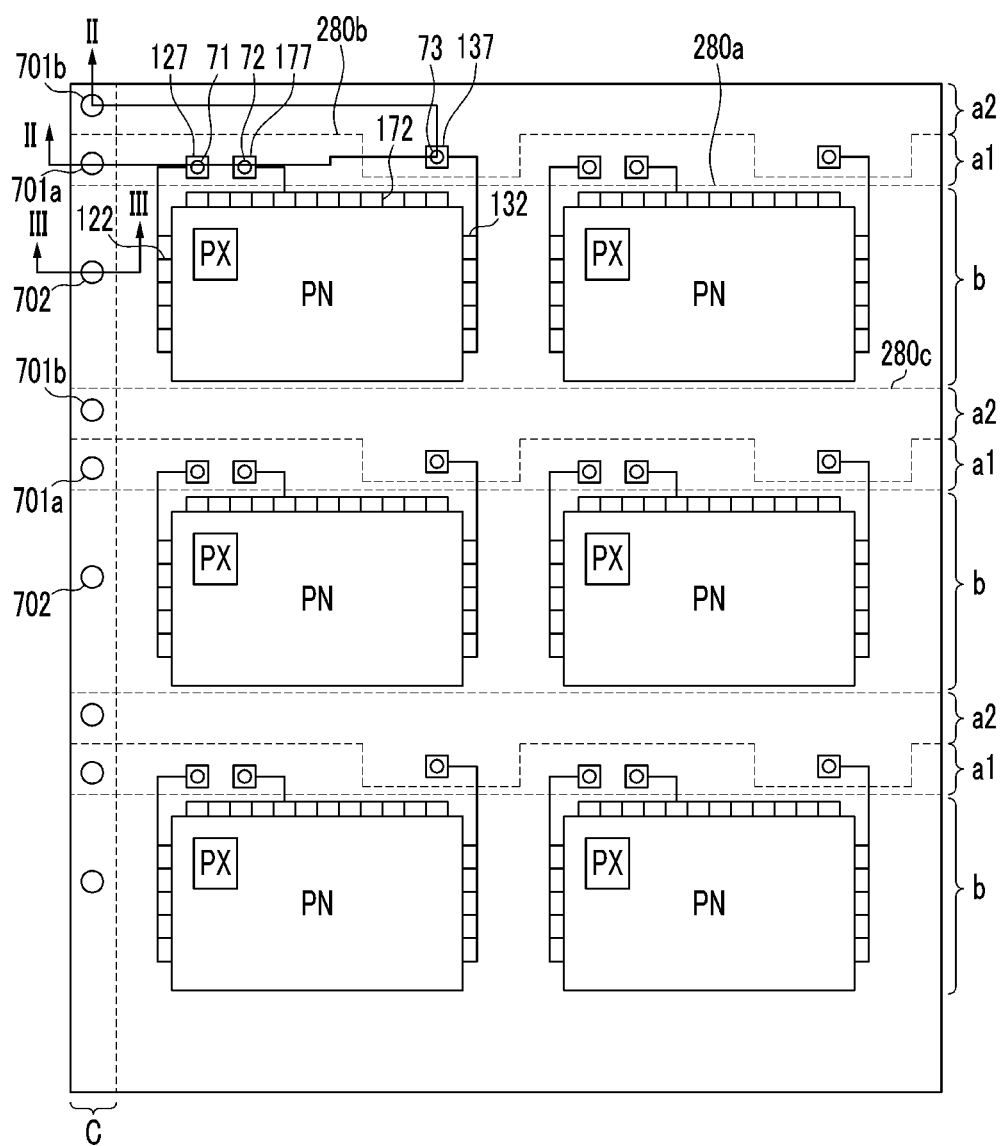
FIG. 1 is a top plan view to explain an exemplary embodiment of a manufacturing method of a liquid crystal display ("LCD") according to an exemplary embodiment.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Now, an LCD and a manufacturing method thereof according to an exemplary embodiment will be described with reference to the accompanying drawings.

First, the LCD and the manufacturing method thereof according to an exemplary embodiment will be described with reference to FIGS. 1 to 3.

Figure 2:
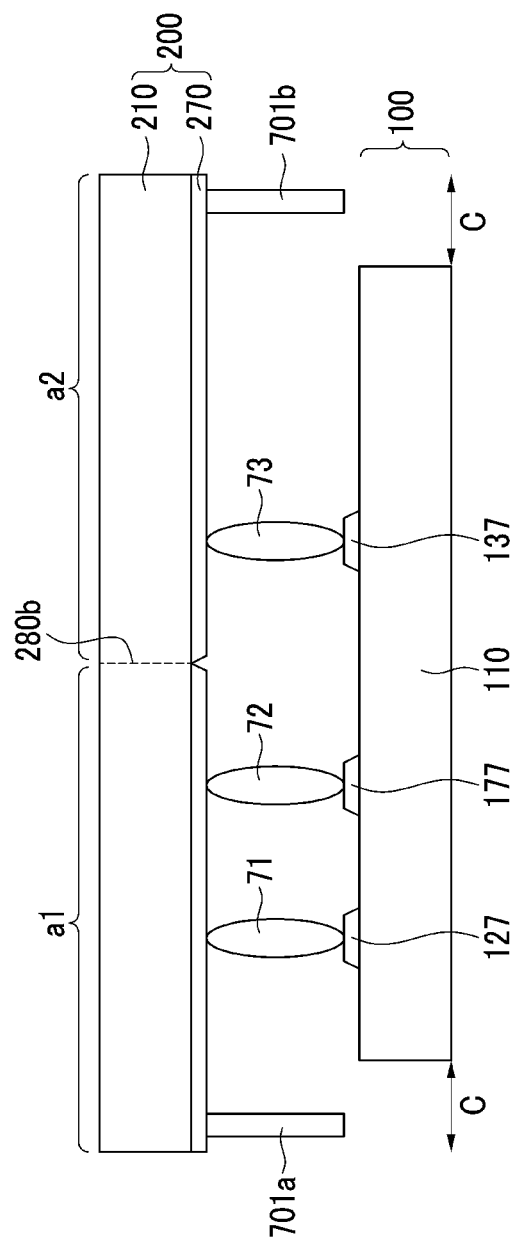
FIG. 2 is a cross-sectional view taken along line II-II of FIG. 1.
Figure 3:
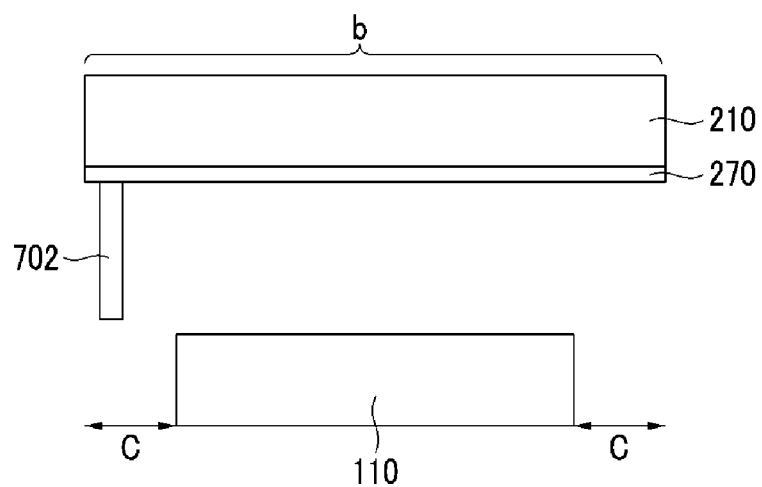
FIG. 3 is a cross-sectional view taken along line of FIG. 1.

FIG. 1 is a top plan view to explain a manufacturing method of an LCD according to an exemplary embodiment, FIG. 2 is a cross-sectional view taken along line II-II of FIG. 1, and FIG. 3 is a cross-sectional view taken along line of FIG. 1.

Referring to FIGS. 1 to 3, an LCD including one mother glass that is completed with a panel combination process in the manufacturing method of the LCD according to an exemplary embodiment has several display panels PN for the LCD. In an exemplary embodiment, as shown in FIG. 1, the display panel includes six regions of display panels PN. Each display panel PN includes a plurality of pixels PX.

The display panel PN includes a TFT array panel 100 provided with a plurality of thin films (not shown) and a common electrode panel 200. The TFT array panel 100 includes a first substrate 110 and a plurality of thin films disposed on the first substrate 110, and the common electrode panel 200 includes a second substrate 210 and a common electrode 270 disposed on the second substrate 210. The TFT array panel 100 and the common electrode panel 200 will be described in detail later.

A plurality of voltage application units 701a, 701b, and 702 are provided in an edge of the LCD including one mother glass panel including the plurality of display panels PN. The voltage application units 701a, 701b, and 702 contact a pin or probe for supplying voltages.

In each display panel PN, a plurality of gate driving signal lines 122 connected to a gate line (not shown), a plurality of data driving signal lines 172 connected to a data line (not shown), and a plurality of reference driving signal lines 132 connected to a reference voltage line (not shown) are provided. The plurality of gate driving signal lines 122 are connected to a gate driving pad 127, the plurality of data driving signal lines 172 are connected to a data driving pad 177, and the plurality of reference driving signal lines 132 are connected to a reference driving pad 137.

The display panel PN is divided into a plurality of regions, a first region a1, a second region a2, and a third region b by a plurality of region definition lines 280a, 280b, and 280c. In an exemplary embodiment, the region definition lines 280a, 280b, and 280c may be provided by using a laser, for example. The region definition lines 280a, 280b, and 280c are provided in the common electrode panel 200, thereby the common electrode 270 provided in the common electrode panel 200 is electrically insulated depending on the regions a1, a2, and b.

The voltage application units 701a, 701b, and 702 may be provided in the common electrode panel 200 and an edge portion c of the TFT array panel 100 corresponding to the region where the plurality of voltage application units 701a, 701b, and 702 are provided is removed such that the common electrode panel 200 provided with the voltage application units 701a, 701b, and 702 is exposed.

In the illustrated exemplary embodiment, a first short point 71 is disposed on the gate driving pad 127, a second short point 72 is disposed on the data driving pad 177, and a third short point 73 is disposed on the reference driving pad 137.

The gate driving pad 127, the first short point 71, the data driving pad 177, and the second short point 72 are provided in the first region a1, and the reference driving pad 137 and the third short point 73 are provided in the second region a2.

In the first region a1, by the first short point 71 and the second short point 72, the TFT array panel 100 and the common electrode panel 200 are electrically connected to each other. In the second region a2, through the third short point 73, the TFT array panel 100 and the common electrode panel 200 are electrically connected to each other. The short points 71, 72, and 73 may be disposed on one of the TFT array panel 100 and the common electrode panel 200, and contact the TFT array panel 100 and the common electrode panel 200.

When the first voltage is applied to the first voltage application unit 701a provided in the first region a1, the first voltage passes through the common electrode 270 of the common electrode panel 200, is applied to the gate driving pad 127 and the data driving pad 177 of the TFT array panel 100 through the first short point 71 and the second short point 72, and is transmitted to the gate driving signal line 122 and the data driving signal line 172. When the second voltage is applied to the second voltage application unit 701b provided in the second region a2, the applied second voltage passes through the common electrode 270 of the common electrode panel 200, is applied to the reference driving pad 137 of the TFT array panel 100 through the third short point 73, and is transmitted to the plurality of reference driving signal lines 132.

Also, when a third voltage is applied to the third voltage application unit 702, the applied third voltage is applied to the common electrode 270 of the common electrode panel 200. The third region includes a region corresponding to the plurality of pixel electrodes PX of the display panel PN.

As described above, since the common electrode panel 200 is divided into the plurality of regions a1, a2, and b, which are electrically insulated by the region definition lines 280a 280b, and 280c, the voltages applied to the voltage application units 701a, 701b, and 702 are respectively transmitted to the regions a1, a2, and b that are insulated from each other.

As such, according to the manufacturing method of the display panel according to an exemplary embodiment, since the gate line, the data line, and the reference voltage line provided in the TFT array panel of the plurality of panels and the common electrode provided in the common electrode panel may be respectively applied with a voltage of a desired magnitude, in the initial photo alignment process, by applying the voltage by the unit of the mother panel glass including the plurality of cells of the LCD, the manufacturing cost may be reduced and simultaneously voltages of a desired magnitude may be applied to the gate line, the data line, and the reference voltage line of each cell, thereby increasing accuracy of the initial alignment.

Figure 4:
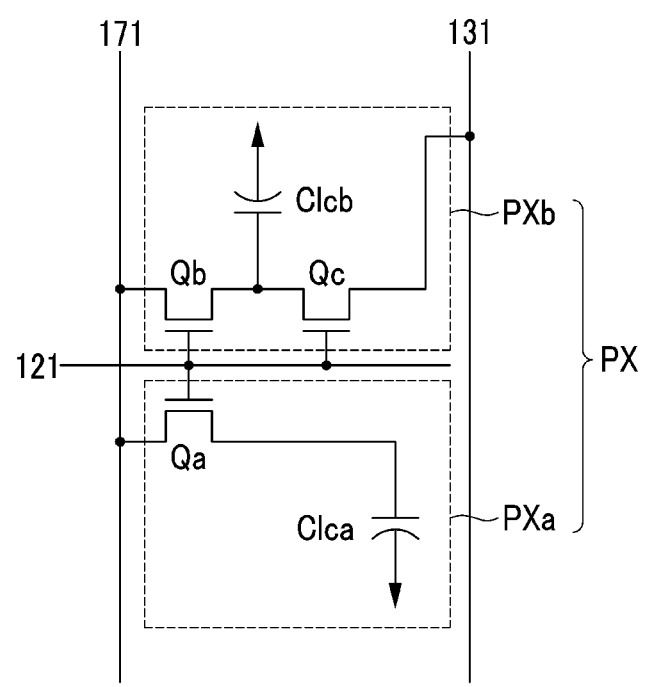
FIG. 4 is an equivalent circuit diagram of an exemplary embodiment of one pixel of an LCD according to the invention.
Figure 5:
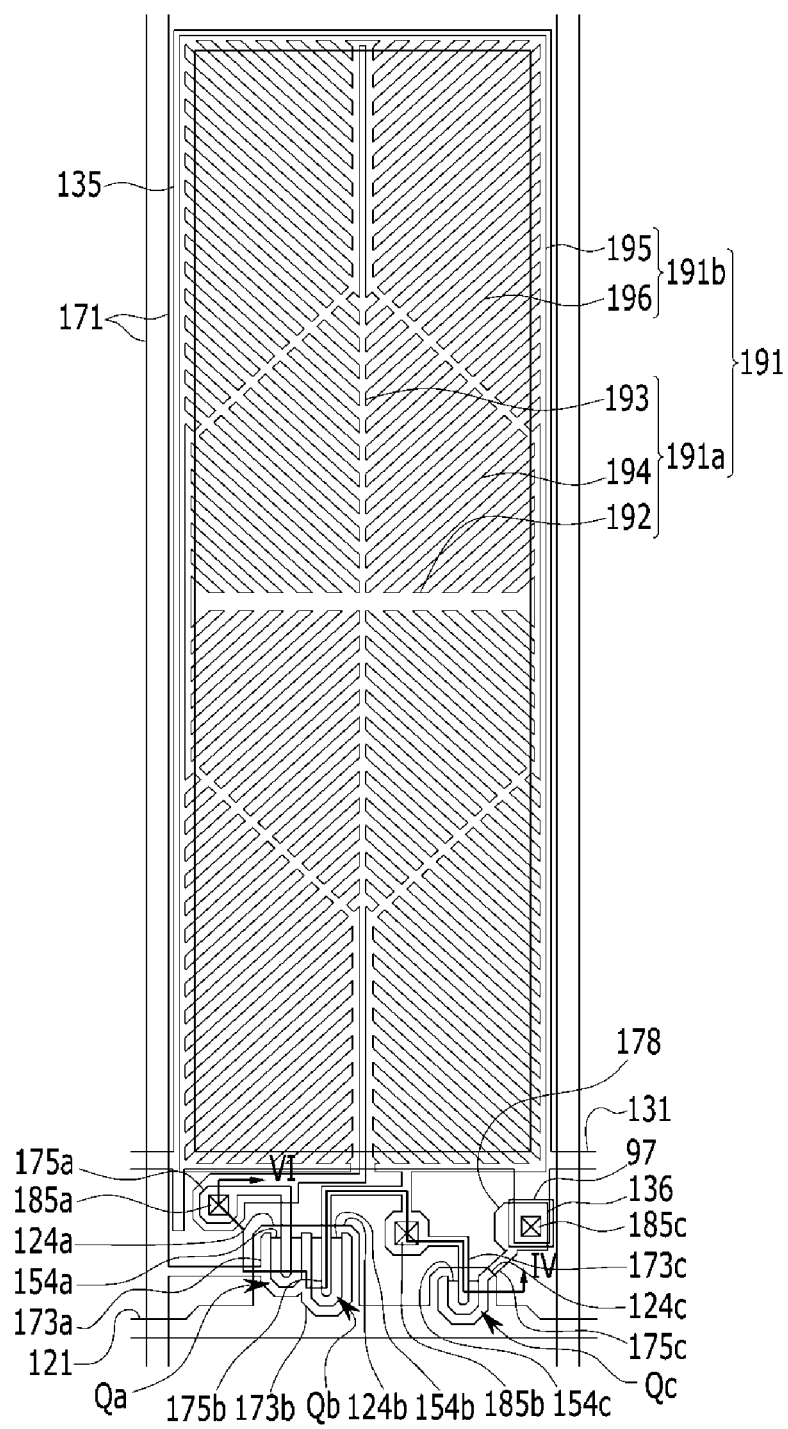
FIG. 5 is a plan view of one pixel of an exemplary embodiment of an LCD according to the invention.
Figure 6:
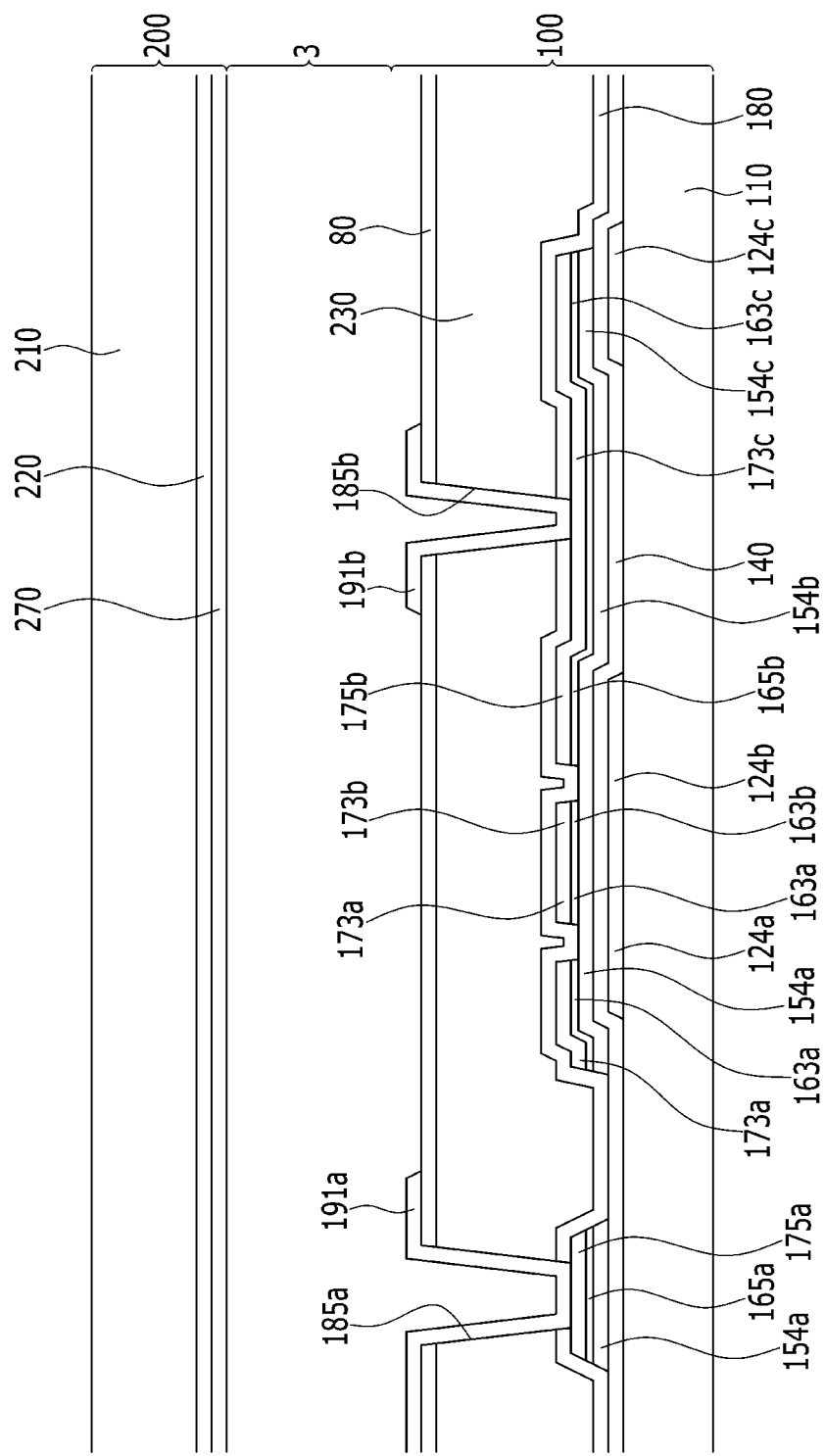
FIG. 6 is a cross-sectional view taken along line VI-VI of FIG. 5.

Next, an example of the structure of one pixel PX of the display panel PN according to an exemplary embodiment will be described with reference to FIGS. 4 to 6. FIG. 4 is an equivalent circuit diagram of one pixel of an LCD according to an exemplary embodiment, FIG. 5 is a plan view of one pixel of an LCD according to an exemplary embodiment, and FIG. 6 is a cross-sectional view taken along line VI-VI of FIG. 5.

Referring to FIG. 4, one pixel PX of the LCD according to the exemplary embodiment may include a plurality of signal lines including a gate line 121 for transmitting gate signals, a data line 171 for transmitting data signals, and a reference voltage line 131 for transmitting a reference voltage, and first to third switching elements Qa, Qb, and Qc, and first and second liquid crystal capacitors Clca and Clcb that are connected to the plurality of signal lines.

The first and second switching elements Qa and Qb are respectively connected to the gate line 121 and the data line 171, and the third switching element Qc is connected to an output terminal of the second switching element Qb and the reference voltage line 131.

The first and second switching elements Qa and Qb are three-terminal elements such as thin film transistors ("TFTs"), control terminals thereof are connected to the gate lines GL, input terminals thereof are connected to the data lines 171, an output terminal of the first switching element Qa is connected to the first liquid crystal capacitor Clca, and an output terminal of the second switching element Qb is connected to the second liquid crystal capacitor Clcb and an input terminal of the third switching Qc.

The third switching element Qc is also a three-terminal element such as a TFT, a control terminal thereof is connected to the gate line 121, an input terminal thereof is connected to the second liquid crystal capacitor Clcb, and an output terminal thereof is connected to the reference voltage line 131.

When a gate-on signal is applied to the gate line 121, the first switching element Qa, the second switching element Qb, and the third switching element Qc connected to the gate line 121 are turned on. Accordingly, a data voltage applied to the data line 171 is applied to a first subpixel electrode 191a (refer to FIG. 5) and a second subpixel electrode 191b (refer to FIG. 5) through the turned-on first switching element Qa and second switching element Qb, respectively. In this case, the data voltages applied to the first subpixel electrode 191a and the second subpixel electrode 191b are the same, and the first liquid crystal capacitor Clca and the second liquid crystal capacitor Clcb are charged to the same value as a difference between the common voltage and the data voltage. Simultaneously, the voltage charged in the second liquid crystal capacitor Clcb is divided through the turned-on third switching element Qc. Thereby, a value of the voltage charged in the second liquid crystal capacitor Clcb is reduced by a difference between the common voltage and the reference voltage. That is, the voltage charged in the first liquid crystal capacitor Clca becomes higher than the voltage charged in the second liquid crystal capacitor Clcb.

Since the voltage of the first liquid crystal capacitor Clca and the voltage of the second liquid crystal capacitor Clcb are different from each other, inclination angles of liquid crystal molecules in a first sub-pixel PXa and a second sub-pixel PXb become different from each other, and thus luminances of the two sub-pixels become different from each other. Accordingly, when the voltage of the first liquid crystal capacitor Clca and the voltage of the second liquid crystal capacitor Clcb are appropriately adjusted, an image viewed in a lateral surface may approximate an image viewed in a front surface as closely as possible, and thus lateral surface visibility may be improved.

Next, the pixel structure of the LCD shown in FIG. 4 will be described with reference to FIGS. 5 and 6.

The LCD according to the illustrated exemplary embodiment includes a lower panel 100 and an upper panel 200 facing each other, a liquid crystal layer 3 interposed between the two display panels 100 and 200, and a pair of polarizers (not shown) attached at the outer surfaces of the display panels 100 and 200.

First, the TFT array panel 100 will be described.

A gate line 121, a reference voltage line 131, and a storage electrode 135 are disposed on a first substrate 110 including transparent glass or plastic. The gate line 121 mainly extends in a horizontal direction and transmits a gate signal.

The gate line 121 includes a first gate electrode 124a, a second gate electrode 124b, and a third gate electrode 124c, and is connected to the above-described gate driving signal line 122 (refer to FIG. 1).

The reference voltage line 131 may extend to be parallel to the gate line 121 and has a reference electrode 136, and the reference electrode 136 is connected to the third drain electrode 175c that will be described later.

The reference voltage line 131 includes a storage electrode 135 enclosing the pixel area, and the reference voltage line 131 is connected to the above-described reference driving signal line 132 (refer to FIG. 1).

A gate insulating layer 140 is disposed on the gate line 121, the reference voltage line 131, and the storage electrode 135.

A first semiconductor 154a, a second semiconductor 154b, and a third semiconductor 154c that may include amorphous or crystalline silicon, for example, are disposed on the gate insulating layer 140.

A plurality of ohmic contacts 163a, 163b, 163c, 165a and 165b are disposed on the first semiconductor 154a, the second semiconductor 154b, and the third semiconductor 154c. When the semiconductors 154a, 154b, and 154c are oxide semiconductors, the ohmic contacts may be omitted.

Data conductors 171, 173a, 173b, 173c, 175a, 175b, and 175c, which include the data line 171 including a first source electrode 173a and a second source electrode 173b, a first drain electrode 175a, a second drain electrode 175b, a third source electrode 173c, and a third drain electrode 175c, are disposed on the ohmic contacts 163a, 163b, 163c, 165a and 165b, and the gate insulating layer 140.

The second drain electrode 175b is connected to the third source electrode 173c.

The first gate electrode 124a, the first source electrode 173a, and the first drain electrode 175a provide a first TFT Qa along with the first semiconductor 154a, and a channel of the TFT is disposed on a portion of the semiconductor 154a between the first source electrode 173a and the first drain electrode 175a. Similarly thereto, the second gate electrode 124b, the second source electrode 173b, and the second drain electrode 175b provide a second TFT Qb along with the second semiconductor 154b, and a channel of the TFT is disposed on a portion of the semiconductor 154b between the second source electrode 173b and the second drain electrode 175b, while the third gate electrode 124c, the third source electrode 173c, and the third drain electrode 175c provide a third TFT Qc along with the third semiconductor 154c, and a channel of the TFT is disposed on a portion of the semiconductor 154c between the third source electrode 173c and the third drain electrode 175c.

In an exemplary embodiment, a passivation layer 180 that may include an inorganic insulator such as silicon nitride or silicon oxide is disposed on the data conductors 171, 173a, 173b, 173c, 175a, 175b, and 175c, and exposed portions of the semiconductors 154a, 154b, and 154c.

A color filter 230 is positioned on the passivation layer 180.

A light blocking member (not shown) may be positioned on a region where the color filter 230 is not positioned and on a portion of the color filter 230. The light blocking member is also referred to as a black matrix and prevents light leakage.

An overcoat (capping layer) 80 is positioned on the color filter 230. The overcoat 80 prevents peeling of the color filter 230 and the light blocking member, and suppresses contamination of the liquid crystal layer 3 by an organic material from the solvent that inflows from the color filter 230, so that it prevents defects such as afterimages that may occur when an image is driven.

A pixel electrode 191 including a first subpixel electrode 191a and a second subpixel electrode 191b that are separated from each other is disposed on the overcoat 80.

Referring to FIG. 5, an overall shape of the first subpixel electrode 191a is a polygon shape such as a hexagon, and the first subpixel electrode 191a is enclosed by the second subpixel electrode 191b. The overall shape of the second subpixel electrode 191b consists of four parallelograms that are gathered and positioned at the edge of the pixel area.

The first subpixel electrode 191a includes a crossed-shape stem 192 and 193 including a transverse stem 192 and a longitudinal stem 193, and a plurality of first branch electrodes 194 extending from the crossed-shape stem 192 and 193. The first branch electrodes 194 extend in four different directions. In detail, the first branch electrodes 194 include a plurality of first minute branches obliquely extending from the crossed-shape stem 192 and 193 in the upper-left direction, a plurality of second minute branches obliquely extending in the upper-right direction, a plurality of third minute branches obliquely extending in the lower-left direction, and a plurality of fourth minute branches obliquely extending in the lower-right direction.

The second subpixel electrode 191b includes an outer stem 195 enclosing the edge of the pixel area, and a plurality of second branch electrodes 196 extending from the outer stem 195. The second branch electrodes 196 extend in four different directions. In detail, the second branch electrodes 196 include a plurality of fifth minute branches obliquely extending in the upper-left direction from the outer stem 195, a plurality of sixth minute branches obliquely extending in the upper-right direction, a plurality of seventh minute branches obliquely extending in the lower-left direction, and a plurality of eighth minute branches obliquely extending in the lower-right direction.

In an exemplary embodiment, an interval between an end of the first subpixel electrode 191a and an end of the second subpixel electrode 191b, which are adjacent to each other, i.e., a separation interval between the first subpixel electrode 191a and the second subpixel electrode 191b, may be about 1 micrometer (μm) to about 5 μm, for example.

A first contact hole 185a exposing a portion of the first drain electrode 175a and a second contact hole 185b exposing a portion of the second drain electrode 175b may be defined in the passivation layer 180 and the overcoat 80.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive the data voltage from the first drain electrode 175a and the second drain electrode 175b through the first contact hole 185a and the second contact hole 185b, respectively.

Now, the common electrode panel 200 will be described.

In an exemplary embodiment, a light blocking member 220 and a common electrode 270 are disposed on a second substrate 210 including transparent glass or plastic, for example.

However, in the case of the LCD according to another exemplary embodiment, the light blocking member 220 may be positioned on the lower panel 100, and in the case of the LCD according to another exemplary embodiment, the color filter may be positioned on the upper panel 200.

Alignment layers (not shown) may be disposed on an inner surface of the display panels 100 and 200, and may be vertical alignment layers.

Polarizers (not shown) may be provided on the outer surface of the two display panels 100 and 200, and transmissive axes of the two polarizers may be orthogonal to each other and that either transmissive axis is parallel to the gate line 121. However, the polarizer may only be disposed at one outer surface of the two display panels 100 and 200.

The liquid crystal layer 3 has negative dielectric anisotropy, and liquid crystal molecules of the liquid crystal layer 3 may be aligned so that long axes of liquid crystal molecules are perpendicular with respect to the surface of the two display panels 100 and 200 in a state in which there is no electric field. Therefore, the incident light does not pass through the crossed polarizers, but is blocked in a state in which there is no electric field.

In an exemplary embodiment, at least one of the liquid crystal layer 3 and the alignment layer may include a photoreactive material, in detail, a reactive mesogen.

Figure 7A:
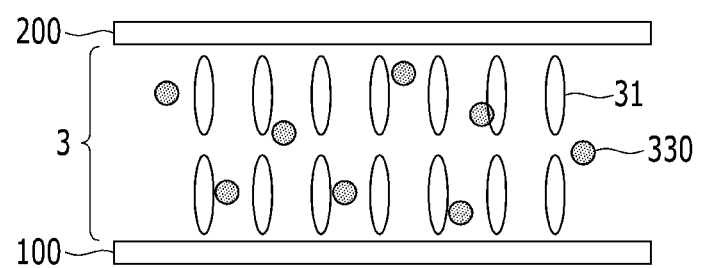
FIGS. 7A to 7D are views showing a process providing a pretilt to liquid crystal molecules by using a prepolymer that is polymerized by light such as ultraviolet rays.
Figure 7B:
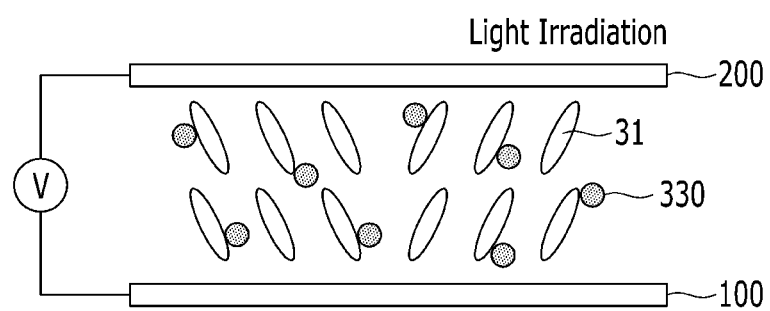

The edges of the plurality of first branch electrodes 194 of the first sub-pixel electrode 191a and the plurality of second branch electrodes 196 of the second sub-pixel electrode 191b distort the electric field to make a horizontal component determining an inclination direction of the liquid crystal molecules 31 (refer to FIGS. 7A and 7B). The horizontal components of the electric field are nearly vertical to the sides of first branch electrodes 194 and the second branch electrodes 196. Accordingly, the liquid crystal molecules 31 are inclined in a direction substantially perpendicular to the sides of the first branch electrodes 194 and second branch electrodes 196 and then collide with each other, thereby being inclined in the direction parallel to the length direction of the first branch electrodes 194 and the second branch electrodes 196. Since one pixel electrode 191 includes four subregions in which longitudinal directions of the first branch electrodes 194 and the second branch electrodes 196 are different from each other, the liquid crystal molecules 31 are inclined in about four directions, and four domains, in which the alignment directions of the liquid crystal molecules 31 are different from each other, are provided in the liquid crystal layer 3. As described above, when the inclination direction of the liquid crystal molecules is diversified, a reference viewing angle of the LCD is increased.

The display panel PN (refer to FIG. 1) according to an exemplary embodiment includes the liquid crystal layer interposed between two display panels 100 and 200, and the liquid crystal layer is initially aligned to have an initial pretilt angle.

Next, the method of initially aligning the liquid crystal molecule of the liquid crystal layer to have the initial pretilt angle will be described with reference to FIGS. 7A to 7D. FIGS. 7A to 7D are views showing a process of providing a pretilt to liquid crystal molecules by using a prepolymer that is polymerized by light such as ultraviolet rays.

As shown in FIG. 7A, prepolymers 330, such as a monomer that is polymerized by light such as ultraviolet rays, are injected along with a liquid crystal material between the two display panels 100 and 200. The prepolymer 330 may be a reactive mesogen that is polymerized by light such as ultraviolet rays.

As shown in FIG. 7B, by applying the voltages to the gate line 121, the data line 171, and the reference voltage line 131 disposed in the TFT array panel 100, the data voltage is applied to the first sub-pixel electrode 191a (refer to FIG. 5) and the second sub-pixel electrode 191b (refer to FIG. 5) and the common voltage is applied to the common electrode panel 200 to generate the electric field to the liquid crystal layer 3 between two display panels 100 and 200.

Thus, liquid crystal molecules 31 of the liquid crystal layer 3 are inclined in a direction parallel to the length direction of the branch electrodes through two stages in response to the electric field, as described above, and the liquid crystal molecules 31 in one pixel PX are inclined in a total of four directions.

Figure 7C:
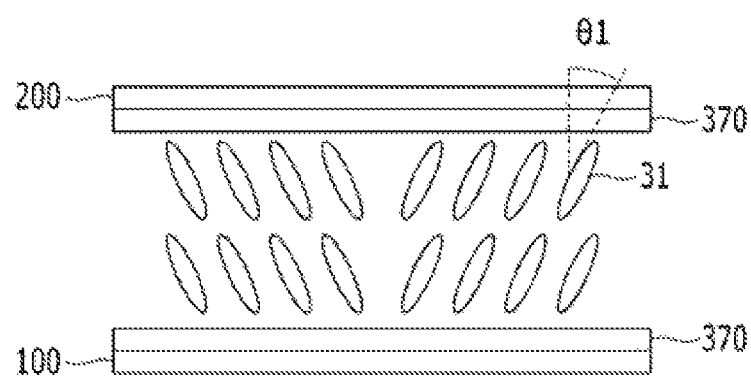
Figure 7D:
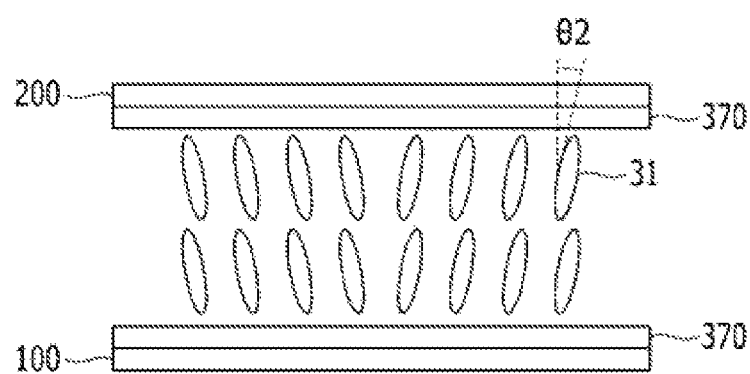

After generating the electric field to the liquid crystal layer 3, when the light such as ultraviolet rays is irradiated, the prepolymers 330 are polymerized to provide a polymer 370 as shown in FIGS. 7C and 7D, and the polymer 370 is an alignment layer initially aligning the liquid crystal molecules 31.

The alignment direction of the liquid crystal molecules 31 is determined by the polymer 370 having the initial pretilt angle in the length direction of the branch electrodes. Accordingly, the liquid crystal molecules 310 have pretilts of four different directions when no voltage is applied to the electrodes 191 and 270. The initial pretilt angle of the liquid crystal molecules described in the specification means a small angle among the angles between an imaginary line vertical to the surface of the substrate and the long axis of the liquid crystal molecules that are initially aligned. That is, as the liquid crystal molecules vertical to the surface of the substrate are inclined by the electric field applied to the liquid crystal layer in the state in which the liquid crystal molecules are vertical to the surface of the substrate, the initial pretilt angle is the angle representing when a certain tilt is generated from the initial state. In an exemplary embodiment, the initial pretilt angle may have a value within about 0 degrees to about 90 degrees.

According to the LCD and the manufacturing method thereof according to an exemplary embodiment, when initially aligning the liquid crystal molecules of the liquid crystal layer to have an initial pretilt angle, a voltage of a desired magnitude is applied to the gate line 121, the data line 171, and the reference voltage line 131 provided in the TFT array panel 100, and the common electrode 270. In detail, the first voltage applied to the first voltage application unit 701a passes the common electrode 270 of the common electrode panel 200, is applied to the gate driving pad 127 and the data driving pad 177 of the TFT array panel 100 through the first short point 71 and the second short point 72, and is transmitted to the gate driving signal line 122 and the data driving signal line 172, thereby the first voltage is transmitted to the gate line and the data line. Also, the second voltage applied to the second voltage application unit 701b passes the common electrode 270 of the common electrode panel 200, is applied to the reference driving pad 137 of the TFT array panel 100 through the third short point 73, and is transmitted to the plurality of reference driving signal lines 132, and thereby the second voltage is applied to the reference voltage line. Also, the third voltage applied to the third voltage application unit 702 is applied to the common electrode 270 of the common electrode panel 200. The second voltage and the third voltage may be equal to or different from each other.

In this way, as the first voltage is applied to the gate line and the data line, the second voltage is applied to the reference voltage line, and the third voltage is applied to the common electrode 270, while the magnitudes of the voltages applied to the first sub-pixel electrode 191a and the second sub-pixel electrode 191b provided in one pixel area are different from each other. Thus, as the magnitudes of the voltages applied to the first sub-pixel electrode 191a and the second sub-pixel electrode 191b are different, as shown in FIGS. 7C and 7D, a first initial pretilt angle θ1 of the liquid crystal molecule 31 corresponding to the first sub-pixel electrode 191a and a second initial pretilt angle θ2 of the liquid crystal molecule 31 corresponding to the second sub-pixel electrode 191b are different from each other. The magnitude of the first initial pretilt angle θ1 of the liquid crystal molecule 31 corresponding to the first sub-pixel electrode 191a applied with the relatively large voltage is larger than the second initial pretilt angle θ2 of the liquid crystal molecule 31 corresponding to the second sub-pixel electrode 191b applied with the relatively small voltage. In an exemplary embodiment, a difference between the first initial pretilt angle θ1 and the second initial pretilt angle θ2 may be in a range from about 0.5 degrees to about 2 degrees, and more specifically, about 1 degree, for example.

According to the LCD and the manufacturing method thereof according to an exemplary embodiment, in the first sub-pixel electrode 191a and the second sub-pixel electrode 191b provided in one pixel area, the first initial pretilt angle θ1 of the liquid crystal molecule 31 corresponding to the first sub-pixel electrode 191a and the second initial pretilt angle θ2 of the liquid crystal molecule 31 corresponding to the second sub-pixel electrode 191b may be initially aligned to be different from each other. Accordingly, the transmittance of the LCD is increased.

In this way, the liquid crystal layer 3 of the display panel PN according to an exemplary embodiment is initially aligned through the irradiation of the light under the application of the voltage to the two display panels 100 and 200. According to a manufacturing method of a display panel according to an exemplary embodiment, the voltage application to the two display panels 100 and 200 for the initial alignment is not executed as a unit of each display panel PN, but as a unit of the display panel including a plurality of display panels PN (refer to FIG. 1), and the reference voltage line as well as the gate line and the data lines connected to the pixel electrode may be separately applied with the voltages of a desired magnitude, thereby being initially aligned for the first initial pretilt angle θ1 of the liquid crystal molecule 31 corresponding to the first sub-pixel electrode 191a and the second initial pretilt angle θ2 of the liquid crystal molecule 31 corresponding to the second sub-pixel electrode 191b in one pixel area, in order to be different from each other.

Figure 8:
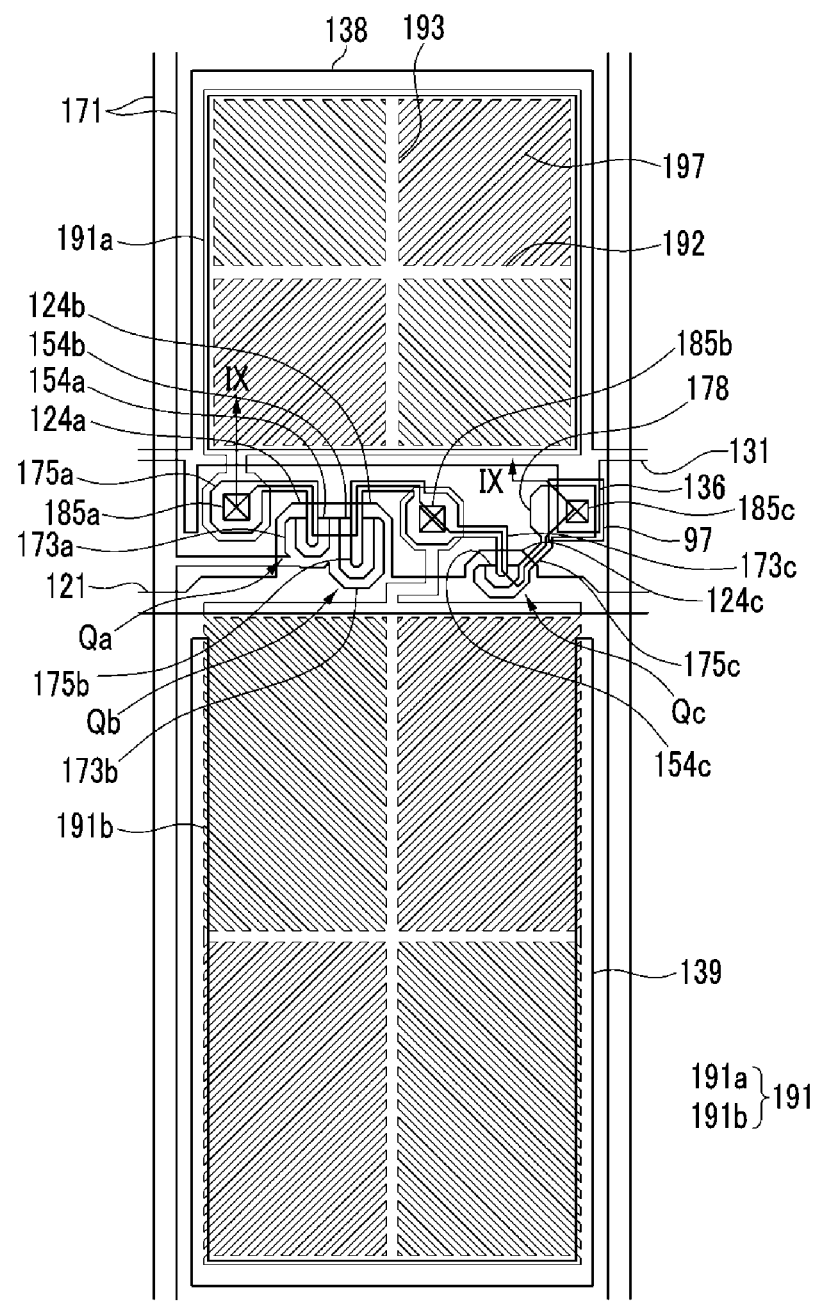
FIG. 8 is a plan view of one pixel of another exemplary embodiment of an LCD according to the invention.

Next, the pixel structure of the LCD according to another exemplary embodiment will be described in detail with reference to FIGS. 8 and 9. FIG. 8 is a plan view of one pixel of an LCD according to another exemplary embodiment, and FIG. 9 is a cross-sectional view taken along line IX-IX of FIG. 8.

Figure 9:
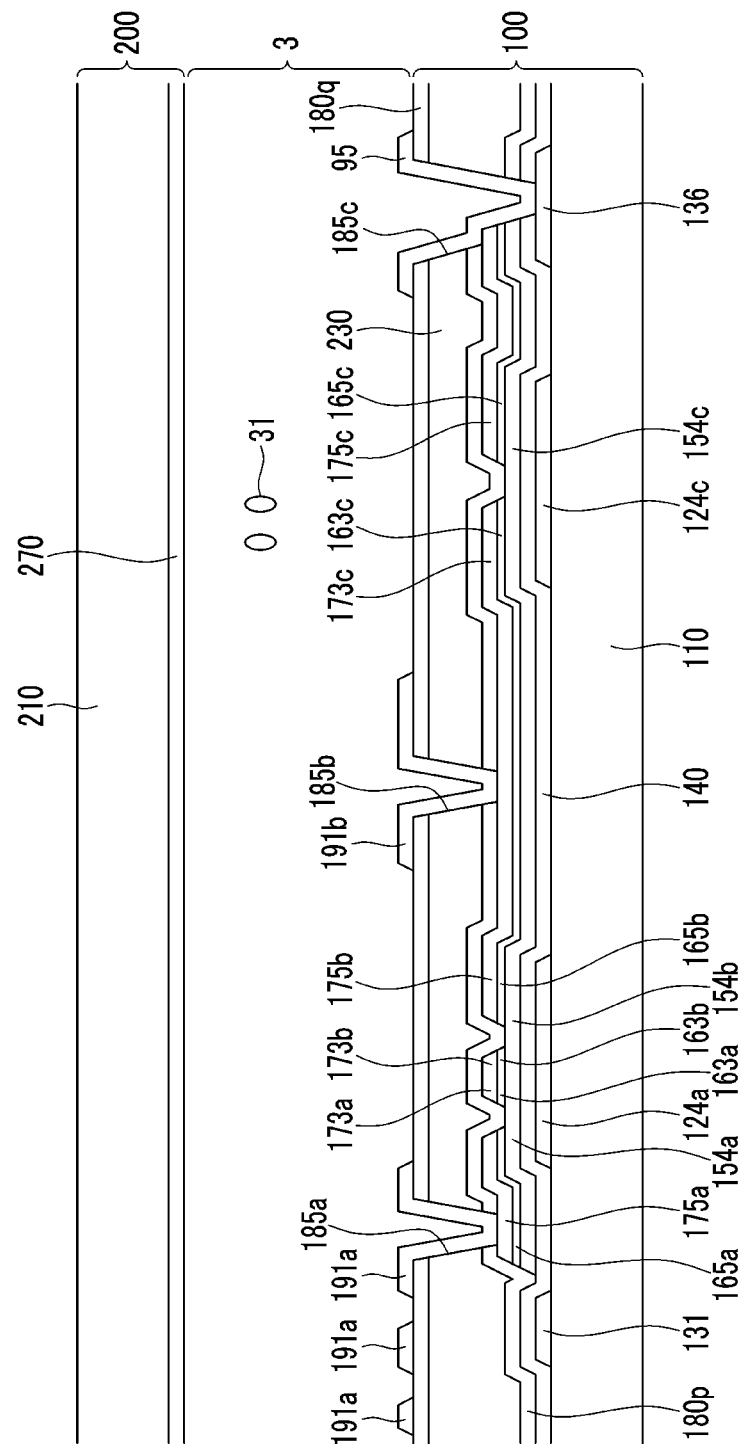
FIG. 9 is a cross-sectional view taken along line IX-IX of FIG. 8.

Referring to FIGS. 8 and 9, the LCD according to the exemplary embodiment includes the TFT array panel 100 and the common electrode panel 200 facing each other, the liquid crystal layer 3 interposed between the two display panels 100 and 200, and a pair of polarizers (not shown) attached at the outer surfaces of the display panels 100 and 200.

First, the TFT array panel 100 will be described.

In an exemplary embodiment, A gate conductor including a gate line 121 and a reference voltage line 131 is disposed on an insulating substrate 110 including transparent glass, plastics, or the like, for example.

The gate line 121 includes a first gate electrode 124a, a second gate electrode 124b, and a third gate electrode 124c.

The reference voltage line 131 includes a first storage electrode 138 and a reference electrode 136. A second storage electrode 139 that is not connected to the reference voltage line 131 is positioned to overlap the second subpixel electrode 191b.

A gate insulating layer 140 is disposed on the gate line 121 and the reference voltage line 131.

A first semiconductor 154a, a second semiconductor 154b, and a third semiconductor 154c are disposed on the gate insulating layer 140.

A plurality of ohmic contacts 163a, 165a, 163b, 165b, 163c, and 165c is disposed on the semiconductors 154a, 154b, and 154c.

Data conductors including a plurality of data lines 171 including a first source electrode 173a and a second source electrode 173b, a first drain electrode 175a, a second drain electrode 175b, a third source electrode 173c, and a third drain electrode 175c are disposed on the ohmic contacts 163a, 165a, 163b, 165b, 163c, and 165c, and the gate insulating layer 140.

The data conductors, and the semiconductors and the ohmic contacts positioned under the data conductors, may be simultaneously provided by using one mask.

The first gate electrode 124a, the first source electrode 173a, and the first drain electrode 175a provide a first TFT Qa together with the first semiconductor 154a, and a channel of the TFT is provided at the semiconductor 154a between the first source electrode 173a and the first drain electrode 175a. Similarly, the second gate electrode 124b, the second source electrode 173b, and the second drain electrode 175b provide a second TFT Qb together with the second semiconductor 154b, and a channel of the TFT is provided at the semiconductor 154b between the second source electrode 173b and the second drain electrode 175b, and the third gate electrode 124c, the third source electrode 173c, and the third drain electrode 175c provide a third TFT Qc together with the third semiconductor 154c, and a channel of the TFT is provided at the semiconductor 154c between the third source electrode 173c and the third drain electrode 175c.

The second drain electrode 175b is connected with the third source electrode 173c. The third drain electrode 175c includes an extended portion 178 that is widely extended.

A first passivation layer 180p is disposed on the data conductors 171, 173c, 175a, 175b, and 175c, and exposed portions of the semiconductors 154a, 154b, and 154c. In an exemplary embodiment, the first passivation layer 180p may include an inorganic insulating layer, such as a silicon nitride or a silicon oxide. The first passivation layer 180p may prevent a pigment of a color filter 230 from flowing into the exposed portions of the semiconductors 154a, 154b, and 154c.

The color filter 230 is disposed on the first passivation layer 180p. The color filter 230 is extended in a vertical direction along two adjacent data lines.

A second passivation layer 180q is disposed on the color filter 230.

In an exemplary embodiment, the second passivation layer 180q may include an inorganic insulating layer, such as a silicon nitride or a silicon oxide. The second passivation layer 180q prevents the color filter 230 from being peeled, and suppresses contamination of the liquid crystal layer 3 by an organic material such as a solvent flowing in from the color filter 230, thereby preventing defects such as an afterimage that may occur when a screen is driven.

A first contact hole 185a and a second contact hole 185b exposing the first drain electrode 175a and the second drain electrode 175b are defined in the first passivation layer 180p and the second passivation layer 180q, respectively.

A third contact hole 185c exposing a portion of the reference electrode 136 and the extension 178 of the third drain electrode 175c may be defined in the first passivation layer 180p, the second passivation layer 180q, and the gate insulating layer 140, and the third contact hole 185c is covered by the first connecting member 97. The first connecting member 97 electrically connects the reference electrode 136 and the third drain electrode 175c exposed through the third contact hole 185c to each other.

A plurality of pixel electrodes 191 is disposed on the second passivation layer 180q. Each pixel electrode 191 includes the first subpixel electrode 191a and the second subpixel electrode 191b, which are separated from each other with the gate line 121 interposed therebetween, and are adjacent in a column direction based on the gate line 121. In an exemplary embodiment, the pixel electrode 191 may include a transparent material such as indium tin oxide ("ITO") or indium zinc oxide ("IZO"). In an exemplary embodiment, the pixel electrode 191 may include a transparent conductive material such as ITO or IZO, or a reflective metal such as aluminum, silver, chromium, or an alloy thereof.

The overall shape of the first sub-pixel electrode 191a and the second sub-pixel electrode 191b is a quadrangle, and it includes a cross-shaped stem including the transverse stem 192, a longitudinal stem 193 crossing each other, and a plurality of branch electrodes 197 extending in four directions from the crossed-shape stem.

The first subpixel electrode 191a and the second subpixel electrode 191b are connected to the first drain electrode 175a and the second drain electrode 175b through the first contact hole 185a and the second contact hole 185b, respectively, and receive the data voltage from the first drain electrode 175a and the second drain electrode 175b, respectively. In this case, a part of the data voltage applied to the second drain electrode 175b is divided through the third source electrode 173c, so that the size of the voltage applied to the first subpixel electrode 191a may be larger than that of the voltage applied to the second subpixel electrode 192b.

The first subpixel electrode 191a and the second subpixel electrode 191b, to which the data voltage is applied, generate an electric field in conjunction with the common electrode 270 of the upper panel 200 to determine a direction of the liquid crystal molecules 31 of the liquid crystal layer 3 between the two electrodes 191 and 270. The luminance of light passing through the liquid crystal layer 3 is changed according to the determined direction of the liquid crystal molecules 31.

In this case, the edges of the plurality of branch electrodes 197 distort the electric field to make the horizontal components determining the inclination direction of the liquid crystal molecules 31, and the liquid crystal molecules are inclined in the direction parallel to the length direction of the plurality of branch electrodes 197.

Now, the common electrode panel 200 will be described.

A common electrode 270 is disposed on the second substrate 210. An upper alignment layer (not shown) is disposed on the common electrode 270. The upper alignment layer may be the vertical alignment layer.

In an exemplary embodiment, the liquid crystal layer 3 has negative dielectric anisotropy, and the liquid crystal molecules of the liquid crystal layer 3 may be aligned so that a major axis thereof is perpendicular to the surface of the two display panels in the absence of an electric field.

In an exemplary embodiment, at least one of the liquid crystal layer 3 and the alignment layer may include a photo-reactive material, and more specifically, a reactive mesogen, for example.

The display panel PN (refer to FIG. 1) according to an exemplary embodiment includes a liquid crystal layer interposed between two display panels 100 and 200, and the liquid crystal layer is initially aligned to have an initial pretilt angle.

According to the LCD and the manufacturing method thereof according to an exemplary embodiment, when initially aligning the liquid crystal molecule of the liquid crystal layer to have an initial pretilt angle, a voltage of a desired magnitude is applied to the gate line 121, the data line 171, and the reference voltage line 131 provided in the TFT array panel 100, and the common electrode 270. In detail, the first voltage applied to the first voltage application unit 701a passes the common electrode 270 of the common electrode panel 200, is applied to the gate driving pad 127 and the data driving pad 177 of the TFT array panel 100 through the first short point 71 and the second short point 72, and is transmitted to the gate driving signal line 122 and the data driving signal line 172, and thereby the first voltage is transmitted to the gate line and the data line. Also, the second voltage applied to the second voltage application unit 701b passes the common electrode 270 of the common electrode panel 200, is applied to the reference driving pad 137 of the TFT array panel 100 through the third short point 73, and is transmitted to the plurality of reference driving signal lines 132, and thereby the second voltage is applied to the reference voltage line. Also, the third voltage applied to the third voltage application unit 702 is applied to the common electrode 270 of the common electrode panel 200. The second voltage and the third voltage may be equal to or different from each other.

Accordingly, as the first voltage is applied to the gate line and the data line, the second voltage is applied to the reference voltage line, and the third voltage is applied to the common electrode 270, and the magnitudes of the voltages applied to the first sub-pixel electrode 191a and the second sub-pixel electrode 191b provided in one pixel area are different from each other. Thus, as the magnitudes of the voltages applied to the first sub-pixel electrode 191a and the second sub-pixel electrode 191b are different, as shown in FIGS. 7C and 7D, a first initial pretilt angle θ1 of the liquid crystal molecule 31 corresponding to the first sub-pixel electrode 191a and a second initial pretilt angle θ2 of the liquid crystal molecule 31 corresponding to the second sub-pixel electrode 191b are different from each other. The magnitude of the first initial pretilt angle θ1 of the liquid crystal molecules 31 corresponding to the first sub-pixel electrode 191a applied with the relatively large voltage is larger than the second initial pretilt angle θ2 of the liquid crystal molecules 31 corresponding to the second sub-pixel electrode 191b applied with the relatively small voltage. In an exemplary embodiment, a difference between the first initial pretilt angle θ1 and the second initial pretilt angle θ2 may be in a range from about 0.5 degrees to about 2 degrees, and more specifically, about 1 degree, for example.

Accordingly, in the first sub-pixel electrode 191a and the second sub-pixel electrode 191b provided in one pixel area, the first initial pretilt angle θ1 of the liquid crystal molecules 31 corresponding to the first sub-pixel electrode 191a and the second initial pretilt angle θ2 of the liquid crystal molecules 31 corresponding to the second sub-pixel electrode 191b may be initially aligned to be different from each other. Accordingly, the transmittance of the LCD is increased.

Next, the manufacturing method of the LCD including the display panel for the above-described LCD will be described with reference to FIGS. 10 to 15, along with FIG. 1. FIGS. 10 to 15 show a manufacturing method of an LCD according to an exemplary embodiment.

FIGS. 10 to 15 show one display panel PN, as described above, and the LCD according to an exemplary embodiment includes the plurality of display panels.

Figure 10:
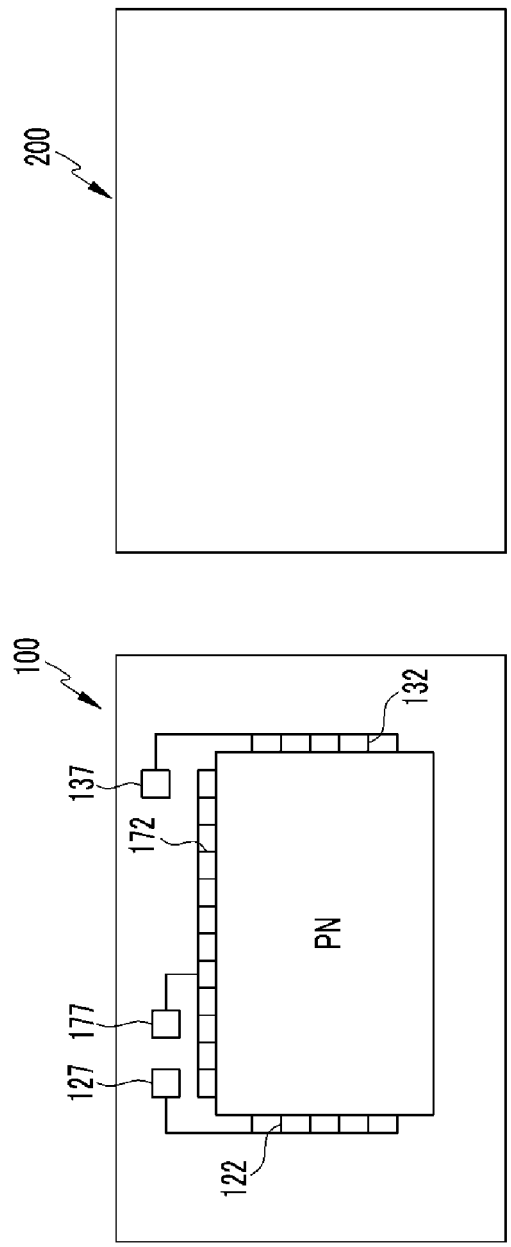

Referring to FIG. 10, a TFT array panel 100 including a plurality of pixels, a plurality of gate driving signal lines 122 connected to a plurality of gate lines 121 (refer to FIG. 8) connected to the plurality of pixels, a gate driving pad 127 connected to the plurality of gate driving signal lines 122, a plurality of data driving signal lines 172 connected to a plurality of data lines 171 (refer to FIG. 8) connected to the plurality of pixels, a data driving pad 177 connected to the plurality of data driving signal lines 172, a plurality of reference driving signal lines 132 connected to a plurality of reference voltage lines 131 (refer to FIG. 8) connected to the plurality of pixels, and a reference driving pad 137 connected to the plurality of reference driving signal lines 132 and a common electrode panel 200 entirely provided with a common electrode (not shown) are provided.

Figure 11:
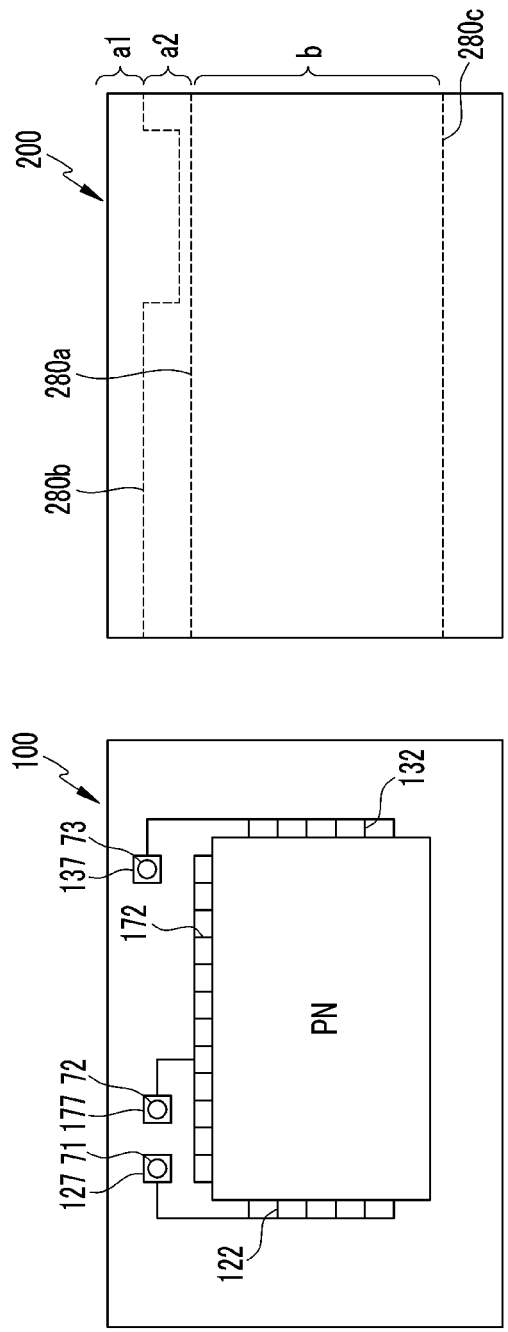

Next, as shown in FIG. 11, a first short point 71 is disposed on the gate driving pad 127 of the TFT array panel 100, a second short point 72 is disposed on the data driving pad 177, and a third short point 73 is disposed on the reference driving pad 137. In an exemplary embodiment, the first short point 71, the second short point 72, and the third short point 73 may include at least one among molybdenum (Mo), copper (Cu), aluminum (Al), nickel (Ni), platinum (Pt), gold (Au), silver (Ag), and chromium (Cr). In an exemplary embodiment, the first short point 71, the second short point 72, and the third short point 73 may be provided by a paste method using a needle, for example.

In addition, region definition lines 280a, 280b, and 280c are provided in the common electrode panel 200 to divide the common electrode 270 of the common electrode panel into a plurality of regions a1, a2, and b.

Next, referring to FIG. 12, a sealant 320 is disposed on one display panel of the TFT array panel 100 and the common electrode panel 200, in which case the sealant 320 is printed for each display panel PN on the circumference of each display panel PN to provide a looped line. In detail, the sealant 320 is provided to enclose the circumference of the display area of the display panel including a plurality of pixel electrodes, and at least a portion of the sealant 320 may be disposed on the gate driving signal line 122 and the data driving signal line 172. Next, after the liquid crystal layer 3 is injected into the portion enclosed by the sealant 320, the TFT array panel 100 and the common electrode panel 200 are aligned to face each other and are pressed by a uniform pressure to combine the TFT array panel 100 and the common electrode panel 200 to each other.

In this case, the liquid crystal layer 3 is only injected into the region enclosed by the sealant 320 within the region b. Also, the alignment layer, specifically the vertical alignment layer, is disposed on the surfaces of the TFT array panel 100 and the common electrode panel 200, and this alignment layer is provided with the entire area in region b and is at least partially provided in regions a1 and a2.

The forming the above region definition lines in the common electrode panel 200 may be performed after adhering the TFT array panel 100 and the common electrode panel 200, as shown in FIG. 12.

Next, as shown in FIG. 13, the portion C of the edge of the TFT array panel 100 is removed to expose the common electrode panel 200 corresponding to the voltage application units 701a, 701b, and 702 (refer to FIG. 1) of the TFT array panel 100.

Next, as shown in FIG. 14, the first voltage is applied to the first voltage application unit 701a of the first region a1, the second voltage is applied to the second voltage application unit 701b of the second region a2, and the third voltage is applied to the third voltage application unit 702 (refer to FIG. 1) of the third region b. To apply the first to third voltages to the first voltage application unit 701a, the second voltage application unit 701b, and the third voltage application unit 702 may use voltage application means such as the pin or the probe for supplying voltages.

The first voltage applied to the first voltage application unit 701a passes through the common electrode 270 disposed on the common electrode panel of the first region a1, is transmitted to the gate driving pad 127 and the data driving pad 177 of the TFT array panel through the first short point 71, and then is applied to the gate line 121 and the data line 171 connected to each pixel. In this case, the voltages are simultaneously applied to the gate driving pad 127, the data driving pad 177, the gate line 121, and the data line 171 of the plurality of display panels PN provided in the first region a1, and thereby the first voltage is simultaneously applied to the gate line 121 and the data line 171 connected to the pixel electrode of the plurality of display panels.

The second voltage applied to the second voltage application unit 701b passes through the common electrode 270 provided in the common electrode panel of the second region a2 and is applied to the reference driving pad 137 of the TFT array panel 100 through the third short point 73, thereby being transmitted to the plurality of reference driving signal lines 132. In this case, the voltage is simultaneously applied to the reference driving pad 137 of the plurality of display panels PN provided in the second region a2, and thereby the second voltage is simultaneously applied to the reference voltage line 131 connected to the pixel electrode of the plurality of display panels.

In contrast, the third voltage applied through the third voltage application unit 702 of the third region b is applied to the common electrode 270 of the common electrode panel, in which case the third voltage is simultaneously applied to the common electrode 270 of the plurality of display panels provided in the third region b.

Figure 15:
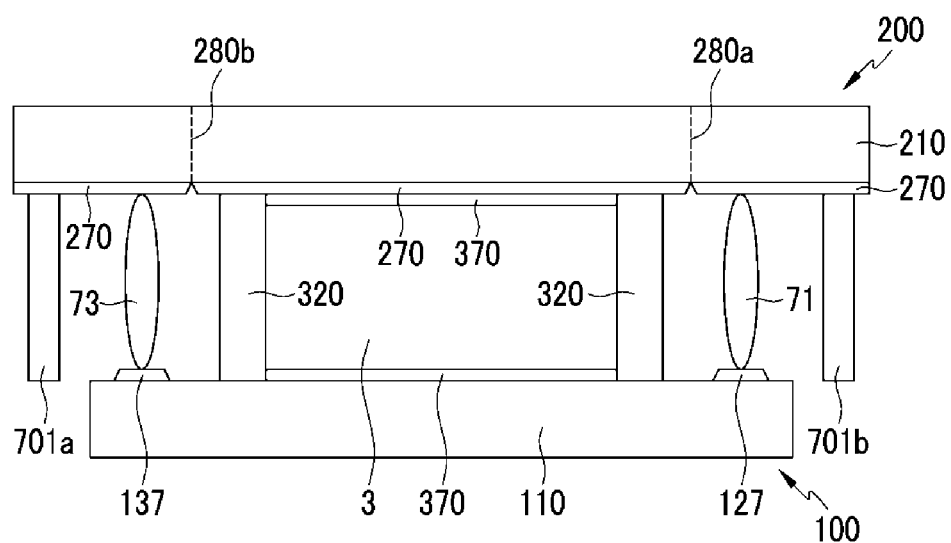

As described above, when simultaneously applying the voltages to the plurality of display panels, by irradiating the light such as ultraviolet rays in a state in which the voltages of desired magnitudes are applied to the plurality of gate lines and the plurality of data lines, and the plurality of reference voltage lines connected to the plurality of pixel electrodes connected to each display panel and the common voltage is applied to the common electrode of the common electrode panel to generate the electric field in the liquid crystal layer between the TFT array panel and the common electrode panel, the plurality of display panels are simultaneously and initially aligned, as shown in FIG. 15, and the layer of the second polymer 370 is disposed on the surface of the TFT array panel 100 and the common electrode panel 200 of the region enclosed by the sealant 320 and injected with the liquid crystal layer 3. In this case, as the first voltage is applied to the gate line and the data line, the second voltage is applied to the reference voltage line, and the third voltage is applied to the common electrode 270, the magnitudes of the voltages applied to the first sub-pixel electrode 191a and the second sub-pixel electrode 191b disposed on one pixel area are different from each other. As such, since the magnitudes of the voltages applied to the first sub-pixel electrode 191a and the second sub-pixel electrode 191 are different, the first initial pretilt angle θ1 of the liquid crystal molecules 31 corresponding to the first sub-pixel electrode 191a and the second initial pretilt angle θ2 of the liquid crystal molecules 31 corresponding to the second sub-pixel electrode 191b are different from each other, as shown in FIGS. 7C and 7D. The magnitude of the first initial pretilt angle θ1 of the liquid crystal molecules 31 corresponding to the first sub-pixel electrode 191a applied with the relatively large voltage is larger than the second initial pretilt angle θ2 of the liquid crystal molecules 31 corresponding to the second sub-pixel electrode 191b applied with the relatively small voltage. In an exemplary embodiment, a difference between the first initial pretilt angle θ1 and the second initial pretilt angle θ2 may be in a range from about 0.5 degrees to about 2 degrees, and more specifically, about 1 degree, for example.

Accordingly, in the first sub-pixel electrode 191a and the second sub-pixel electrode 191b provided in one pixel area, the first initial pretilt angle θ1 of the liquid crystal molecules 31 corresponding to the first sub-pixel electrode 191a and the second initial pretilt angle θ2 of the liquid crystal molecules 31 corresponding to the second sub-pixel electrode 191b may be initially aligned to be different from each other. Accordingly, the transmittance of the LCD is increased.

The liquid crystal layer 3 of the display panel according to an exemplary embodiment is initially aligned through the irradiation of the light under the application of the voltage to the two display panels 100 and 200. According to a manufacturing method of a display panel according to an exemplary embodiment, the voltage application to the two display panels 100 and 200 for the initial alignment is not executed as a unit of each display panel PN, but as a unit of the display panel including a plurality of display panels PN, and the reference voltage line as well as the gate line and the data line connected to the pixel electrode may be separately applied with voltages of a desired magnitude. The liquid crystal molecules in the liquid crystal layer are inclined to have a initial pretilt angle by the electric field generated by the first voltage applied to the gate line and the data line, the pixel electrode applied with the second voltage applied to the reference voltage line, and the common voltage of the common electrode 270 applied with the third voltage. Next, by the first polymer and the second polymer 370 generated by the polymer reaction of the prepolymer included in the liquid crystal layer 3 due to ultraviolet rays, the liquid crystal molecules 31 are initially aligned to have different initial pretilt angles for the liquid crystal molecules corresponding to the first sub-pixel electrode 191a and the second sub-pixel electrode 191b.

As described above, according to the manufacturing method of the display panel according to an exemplary embodiment, the gate line and the data line provided in the TFT array panel of a plurality of panels and the common electrode provided in the common electrode panel may be applied with the voltage of a desired magnitude, and in the initial photo alignment process, the voltage is applied as a unit of the mother panel glass including a plurality of cells of the LCD such that the manufacturing cost is simultaneously reduced, and the liquid crystal molecules corresponding to two sub-pixel electrodes are initially aligned to have different initial pretilt angle such that accuracy of the initial alignment may be increased, thereby increasing the transmittance of the LCD.

Figure 16:
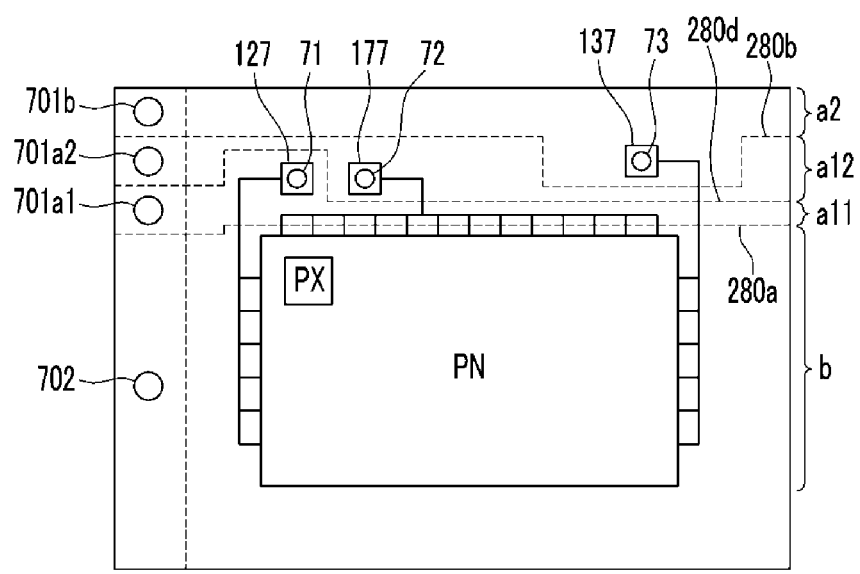
FIG. 16 is a top plan view to explain another exemplary embodiment of a manufacturing method of an LCD according to the invention.

Next, the display panel and the manufacturing method thereof according to another exemplary embodiment will be described with reference to FIG. 16. FIG. 16 is a top plan view explaining a manufacturing method of an LCD according to another exemplary embodiment.

The display panel including one mother glass that is finished with the panel assembly process in the manufacturing method of the display panel according to an exemplary embodiment shown in FIG. 16 is similar to the display panel by the manufacturing method according to the exemplary embodiment shown in FIG. 1.

However, differently from the display panel shown in FIG. 1, the display panel according to the illustrated exemplary embodiment is divided into a first sub-region a11, a second sub-region a12, a second region a2, and a third region b. The first sub-region a11 is provided with the first sub-voltage application unit 701a1 and the gate driving pad 127, the second sub-region a12 is provided with the second sub-voltage application unit 701a2 and the data driving pad 177, the second region a2 is provided with the second voltage application unit 701b and the reference driving pad 137, and the third region b is provided with the third voltage application unit 702.

According to the manufacturing method of the display panel according to the exemplary embodiment, a first sub-voltage is applied to the gate line 121 through the first sub-voltage application unit 701a1 and the gate driving pad 127 provided in the first sub-region a11, a second sub-voltage is applied to the data line 171 through the second sub-voltage application unit 701a2 and the data driving pad 177 provided in the second sub-region a12, the second voltage is applied to the reference voltage line 131 through the second voltage application unit 701b and the reference driving pad 137 provided in the second region a2, and the third voltage is applied to the common voltage 270 through the third voltage application unit 702 provided in the third region b. The display panel PN is divided by a plurality of region definition lines 280a, 280b, and 280d.

In this regard, according to the manufacturing method of the display panel according to an exemplary embodiment, since the gate line, the data line, and the reference voltage line provided in the TFT array panel of the plurality of panels and the common electrode provided in the common electrode panel may be respectively applied with a voltage of a desired magnitude, in the initial photo alignment process, by applying the voltage by the unit of the mother panel glass including the plurality of cells of the LCD, the manufacturing cost may be reduced and simultaneously the voltages of desired magnitudes may be applied to the gate line, the data line, the reference voltage line, and the common electrode of each cell, and thereby the first initial pretilt angle θ1 of the liquid crystal molecules 31 corresponding to the first sub-pixel electrode 191a and the second initial pretilt angle θ2 of the liquid crystal molecules 31 corresponding to the second sub-pixel electrode 191b may be different to be initially aligned. Accordingly, the accuracy of the initial alignment may be increased and the transmittance of the LCD may be increased.

All characteristics according to the exemplary embodiment described with reference to FIGS. 1 to 15 may be applied to the manufacturing method of the display panel according to the illustrated exemplary embodiment.

Figure 17:
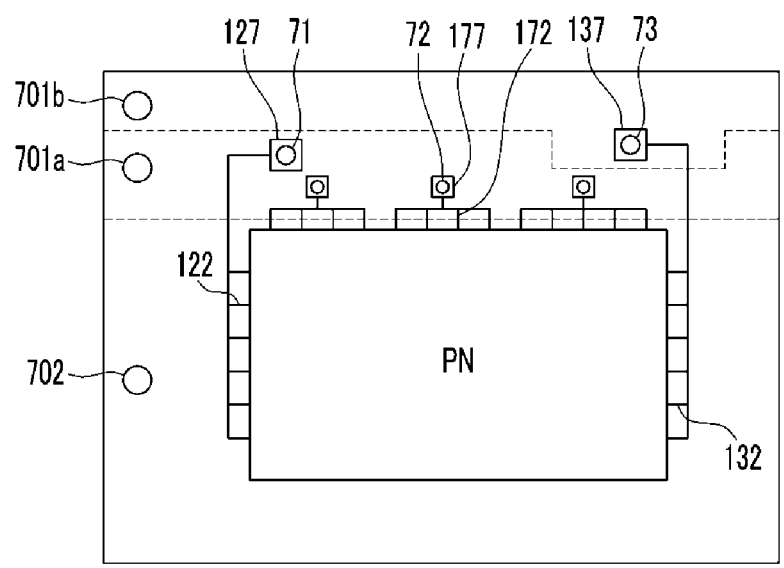
FIG. 17 is a top plan view to explain another exemplary embodiment of a manufacturing method of an LCD according to the invention.

Next, the display panel and the manufacturing method thereof according to another exemplary embodiment will be described with reference to FIG. 17. FIG. 17 is a top plan view showing a manufacturing method of an LCD according to another exemplary embodiment.

The display panel including one mother glass that is finished with the panel assembly process in the manufacturing method of the display panel according to an exemplary embodiment shown in FIG. 17 is similar to the display panel by the manufacturing method according to the exemplary embodiment shown in FIG. 1.

However, differently from the display panel shown in FIG. 1, a plurality of data driving pads 177 and a plurality of second short points 72 are provided in the first region a1 of the display panel PN according to the exemplary embodiment. The plurality of data driving pads 177 is respectively connected to the portion of the plurality of data driving signal lines 172 provided in one display panel PN. That is, the plurality of data driving signal lines 172 provided in one display panel PN is divided into a plurality of groups, and the plurality of data driving signal lines 172 in each group is connected to one data driving pad 177. In this regard, the plurality of data driving signal lines 172 connected to the plurality of data lines 171 provided in one display panel PN is divided into a plurality of groups, and a plurality of data driving signal lines 172 of each group is connected to one data driving pad 177. Accordingly, the voltage may be separately applied through the data driving pad 177 and the second short point 72 for each group of the plurality of data driving signal lines 172. Accordingly, the magnitude of the voltage applied to the data line 171 may be prevented from being voltage-dropped depending on the position of the display panel PN.

All characteristics according to the exemplary embodiment described with reference to FIGS. 1 to 16 may be applied to the manufacturing method of the display panel according to the illustrated exemplary embodiment.

Figure 18:
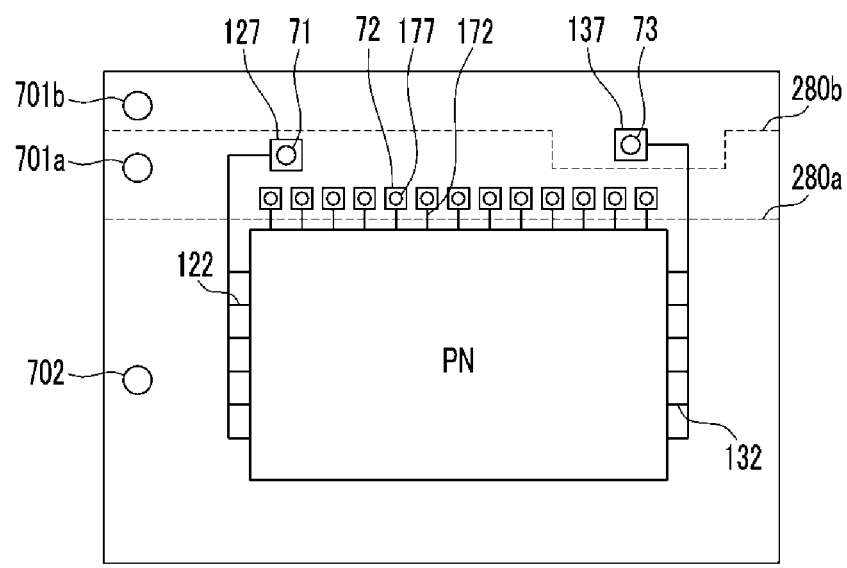
FIG. 18 is a top plan view to explain another exemplary embodiment of a manufacturing method of an LCD according to the invention.

Next, the display panel and the manufacturing method thereof according to another exemplary embodiment will be described with reference to FIG. 18. FIG. 18 is a top plan view showing a manufacturing method of an LCD according to another exemplary embodiment.

The display panel including one mother glass that is finished with the panel assembly process in the manufacturing method of the display panel according to an exemplary embodiment shown in FIG. 18 is similar to the display panel by the manufacturing method according to the exemplary embodiment shown in FIG. 1.

However, differently from the display panel according to FIG. 1, a plurality of data driving pads 177 and a plurality of second short points 72 are provided in the first region a1 of the display panel PN according to the illustrated exemplary embodiment. The plurality of data driving pads 177 is respectively connected to the plurality of data driving signal lines 172 provided in one display panel PN. That is, the plurality of data driving signal lines 172 provided in one display panel PN is connected to one data driving pad 177, respectively. Accordingly, the plurality of data driving signal lines 172 connected to the plurality of data lines 171 provided in one display panel PN is separately connected to one data driving pad 177, respectively. Therefore, the plurality of data driving signal lines 172 may be separately applied through one data driving pad 177 and second short point 72, respectively. Accordingly, the magnitude of the voltage applied to the data line 171 may be prevented from being voltage-dropped depending on the position of the display panel PN.

All characteristics according to the exemplary embodiment described with reference to FIGS. 1 to 16 may be applied to the manufacturing method of the display panel according to the illustrated exemplary embodiment.

Figure 19:
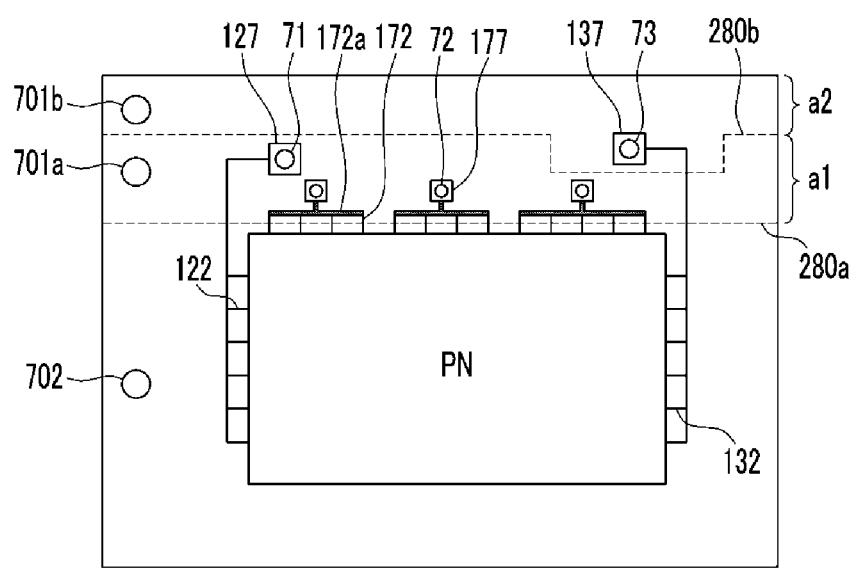
FIG. 19 is a top plan view to explain another exemplary embodiment of a manufacturing method of an LCD according to the invention.

Next, the display panel and the manufacturing method thereof according to another exemplary embodiment will be described with reference to FIG. 19. FIG. 19 is a top plan view showing a manufacturing method of an LCD according to another exemplary embodiment.

The display panel including one mother glass that is finished with the panel assembly process in the manufacturing method of the display panel according to an exemplary embodiment shown in FIG. 19 is similar to the display panel by the manufacturing method according to the exemplary embodiment shown in FIG. 1.

However, differently from the display panel according to FIG. 1, a plurality of data driving pads 177 and a plurality of second short points 72 are provided in the first region a1 of the display panel PN according to the illustrated exemplary embodiment. The plurality of data driving pads 177 is respectively connected to the portion of the plurality of data driving signal lines 172 provided in one display panel PN. That is, the plurality of data driving signal lines 172 provided in one display panel PN is divided into the plurality of groups, and the plurality of data driving signal lines 172 in each group is connected to one data driving pad 177. Like this, the plurality of data driving signal lines 172 connected to the plurality of data lines 171 provided in one display panel PN is divided into the plurality of groups and the plurality of data driving signal lines 172 of each group is connected to one data driving pad 177. In addition, a first connection line 172a is provided between the plurality of data driving signal lines 172 of each group and one data driving pad 177, and a width of the first connection line 172a is greater than the width of a data driving signal line 172. When the width of the signal line transmitted with the signal is increased, the resistance of the signal line is decreased, and thereby the signal transmission speed becomes faster. Accordingly, the voltage applied from the data driving pad 177 may be prevented from being voltage-dropped when applied to the plurality of data driving signal lines 172 of each group.

Also, the voltage may be separately applied through the data driving pad 177 and the second short point 72 for each group of the plurality of data driving signal lines 172. Accordingly, the magnitude of the voltage applied to the data line 171 may be prevented from being voltage-dropped depending on the position of the display panel PN.

All characteristics according to the exemplary embodiment described with reference to FIGS. 1 to 16 may be applied to the manufacturing method of the display panel according to the illustrated exemplary embodiment.

Figure 20:
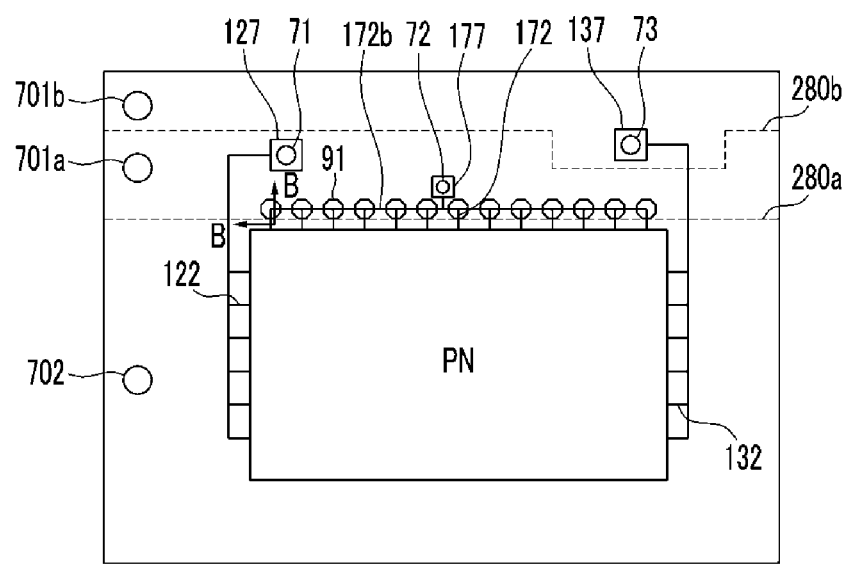
FIG. 20 is a top plan view to explain another exemplary embodiment of a manufacturing method of an LCD according to the invention.
Figure 21:
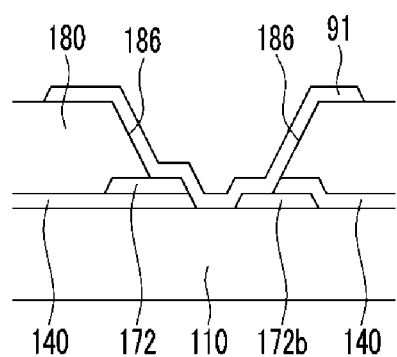
FIG. 21 is a cross-sectional view showing a portion of FIG. 20.

Next, the display panel and the manufacturing method thereof according to another exemplary embodiment will be described with reference to FIGS. 20 and 21. FIG. 20 is a top plan view showing a manufacturing method of an LCD according to another exemplary embodiment, and FIG. 21 is a cross-sectional view showing a portion of FIG. 20 taken along line B-B'.

The display panel including one mother glass that is finished with the panel assembly process in the manufacturing method of the display panel according to an exemplary embodiment shown in FIG. 19 is similar to the display panel by the manufacturing method according to the exemplary embodiment shown in FIG. 1.

However, differently from the display panel according to FIG. 1, a plurality of data driving pads 177 and a second short point 72 are provided in the first region a1 of the display panel PN according to the illustrated exemplary embodiment. The plurality of data driving signal lines 172 is connected to the second connection line 172b. The second connection line 172b may include a material in which the signal resistance is lower than the data driving signal line 172. As such, when transmitting the signal, when the layer including the material having the low resistance is used, the signal transmission speed is faster. In an exemplary embodiment, the second connection line 172b may be provided in the same layer as the gate line 121. The gate insulating layer 140 may be positioned between the second connection line 172b and the data driving signal line 172. The second connection line 172b and the data driving signal line 172 are connected through a fourth contact hole 186 provided in the gate insulating layer 140 and a second connecting member 91 disposed on the fourth contact hole 186.

Accordingly, by connecting the plurality of data driving signal lines 172 to the second connection line 172b having signal resistance, the magnitude of the voltage applied to the data line 171 may be prevented from being voltage-dropped depending on the position of the display panel PN.

All characteristics according to the exemplary embodiment described with reference to FIGS. 1 to 16 may be applied to the manufacturing method of the display panel according to the exemplary embodiment.

The exemplary embodiments may be applied to all display panels in which the initial alignment is performed after forming the initial electric field to the field generating electrode.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first substrate;
a plurality of pixel electrodes disposed on the first substrate and including a first sub-pixel electrode and a second sub-pixel electrode separated from each other and positioned in one pixel area;
a plurality of gate lines connected to the plurality of pixel electrodes; a plurality of data ones connected to the plurality of pixel electrodes; a plurality of reference voltage lines connected to the second sub-pixel electrode of the plurality of pixel electrodes;
a second substrate facing the first substrate; a common electrode disposed on the second substrate; a first pad connected to the plurality of gate lines;
a plurality of second pads respectively connected to the plurality of data lines;

a third pad connected to the plurality of reference voltage lines; a first short point disposed on the first pad;

a plurality of second short points disposed on the plurality of second pads; a third short point disposed on the third pad;

a first voltage application unit, a second voltage application unit, and a third voltage application unit disposed between the first substrate and the second substrate; and a liquid crystal layer positioned between the first substrate and the second substrate and including a plurality of liquid crystal molecules including first and second crystal molecules, wherein a first initial pretilt angle of the first liquid crystal molecules of the plurality of liquid crystal molecules corresponding to the first sub-pixel electrode with reference to a direction perpendicular to a surface of the second substrate is larger than a second initial pretilt angle of the second liquid crystal molecules of the plurality of liquid crystal molecules corresponding to the second sub-pixel electrode with reference to the direction perpendicular to the surface of the second substrate, wherein the first short point, the plurality of second short points, and the first voltage application unit are disposed in a first region, wherein the third short point and the second voltage application unit are disposed in a second region, wherein the third voltage application unit is disposed in a third region, and wherein the first region, the second region, and the third region are electrically separated and the first region is disposed between the second region and the third region.

2. The liquid crystal display of claim 1, wherein:
the first short point, the plurality of second short points, and the third short point are electrically connected between the first pad, the plurality of second pads, and the third pad and the common electrode.

3. The liquid crystal display of claim 2, further comprising:
a first thin film transistor connected to the plurality of gate lines, the plurality of data lines, and the first sub-pixel electrode of the plurality of pixel electrodes;
a second thin film transistor connected to the plurality of gate lines, the plurality of data lines, and the second sub-pixel electrode of the plurality of pixel electrodes; and
a third thin film transistor connected to the plurality of gate lines, the second sub-pixel electrode of the plurality of pixel electrodes, and the plurality of reference voltage lines.

4. The liquid crystal display of claim 3, further comprising:
an alignment layer disposed on an inner surface of the first substrate and an inner surface of the second substrate, and
at least one of the alignment layer and the liquid crystal layer includes a light polymerization material.

5. The liquid crystal display of claim 1, wherein:
the plurality of data lines and the plurality of second pads are connected to each other by a first connection portion, and
a width of the first connection portion is greater than a width of the plurality of data lines.

6. The liquid crystal display of claim 1, wherein:
the first initial pretilt angle is larger than the second initial pretilt angle by about 0.3 degrees to about 2 degrees.

7. The liquid crystal display of claim 6, wherein:
the first initial pretilt angle is larger than the second initial pretilt angle by about 1 degree.

* * * * *